(12) United States Patent
Shipman et al.

(10) Patent No.: US 11,900,333 B2
(45) Date of Patent: *Feb. 13, 2024

(54) SYSTEMS AND APPARATUSES FACILITATING A DO-IT-YOURSELF EXPERIENCE-BASED REPAIR SOLUTION

(71) Applicant: AutoZone Parts, Inc., Memphis, TN (US)

(72) Inventors: Michael Paul Shipman, Collierville, TN (US); F. Scott Brown, Germantown, TN (US); Destry J. Withers, Millington, TN (US); Howard Bryson Morgan, Arlington, TN (US)

(73) Assignee: AutoZone Parts, Inc., Memphis, TN (US)

( * ) Notice: Subject to any disclaimer, the term of this patent is extended or adjusted under 35 U.S.C. 154(b) by 173 days.

This patent is subject to a terminal disclaimer.

(21) Appl. No.: 17/373,160

(22) Filed: Jul. 12, 2021

(65) Prior Publication Data
US 2021/0342792 A1    Nov. 4, 2021

Related U.S. Application Data

(63) Continuation of application No. 15/450,486, filed on Mar. 6, 2017, now Pat. No. 11,093,906.
(Continued)

(51) Int. Cl.
*G06Q 30/00* (2023.01)
*G06Q 10/20* (2023.01)
(Continued)

(52) U.S. Cl.
CPC ......... *G06Q 10/20* (2013.01); *G06Q 10/0875* (2013.01); *G06Q 30/0631* (2013.01); *G06Q 30/0641* (2013.01)

(58) Field of Classification Search
CPC ............................................... G06Q 30/06–08
See application file for complete search history.

(56) References Cited

U.S. PATENT DOCUMENTS 7,620,484 B1    11/2009 Chen
7,636,676 B1    12/2009 Wolery et al.
(Continued)

OTHER PUBLICATIONS

Roanes-Lozano, E., Galan-Garcia, J., and Aguilera-Venegas, G., "A Portable Knowledge-Based System for Car Breakdown Evaluation" Applied Mathematics and Computation 267 (2015) 758-770 (Year: 2015).*

(Continued)

*Primary Examiner* — Ethan D Civan
(74) *Attorney, Agent, or Firm* — Alston & Bird LLP

(57) ABSTRACT

Embodiments are disclosed for facilitating Do-It-Yourself (DIY) repairs. In the context of a method, an example embodiment includes receiving, by an experience-based repair service (EBRS) host system, vehicle diagnostic information identifying one or more vehicle problems. This example embodiment of the method further includes evaluating the vehicle diagnostic information, generating, based on the evaluation of the vehicle diagnostic information, required part types and required tools for addressing the one or more vehicle problems, and generating, based on the evaluation of the vehicle diagnostic information, recommended part types for addressing the one or more vehicle problems. Finally, this example embodiment of the method further includes causing presentation of an interface facilitating purchase of required parts from each of the generated required part types, the required tools, and recommended parts from each of the generated recommended part types. Corresponding apparatuses and computer program products are also provided.

22 Claims, 16 Drawing Sheets

Related U.S. Application Data

(60) Provisional application No. 62/305,643, filed on Mar. 9, 2016.

(51) Int. Cl.
    *G06Q 30/0601*     (2023.01)
    *G06Q 10/0875*     (2023.01)

(56) References Cited

U.S. PATENT DOCUMENTS

| | | |
|---|---|---|
| 8,131,417 B2 | 3/2012 | Picard |
| 8,185,446 B1* | 5/2012 | Kuznetsova ......... G06Q 30/016 705/26.1 |
| 8,781,882 B1 | 7/2014 | Arboletti et al. |
| 9,208,526 B1 | 12/2015 | Leise |
| 9,239,991 B2* | 1/2016 | Connolly ............. G06Q 30/016 |
| 11,093,906 B2* | 8/2021 | Shipman ............ G06Q 10/0875 |
| 2002/0007237 A1 | 1/2002 | Phung et al. |
| 2007/0016483 A1 | 1/2007 | Chenn |
| 2010/0023203 A1 | 1/2010 | Shibi |
| 2011/0246018 A1 | 10/2011 | Bertosa et al. |
| 2012/0130844 A1 | 5/2012 | Picard |
| 2012/0297337 A1 | 11/2012 | Denis et al. |
| 2014/0279169 A1 | 9/2014 | Leos |
| 2015/0039176 A1 | 2/2015 | Fish |
| 2016/0078403 A1* | 3/2016 | Sethi ................. G06Q 10/0875 705/26.81 |

OTHER PUBLICATIONS

Canadian Intellectual Property Office, Requisition by the Examiner received for Application No. 2,960,243, May 25, 2020, 11 pages, Canada.

Office Action for corresponding Canadian Application No. 2,960,243 dated May 18, 2018, 7 pages.

Roanes-Lozano, Eugenio, Jose Luis Galan-Garcia, and Gabriel Aguilera-Venegas. "A portable knowledge-based system for car breakdown evaluation"; Applied Mathematics and Computation; 267 (2015): 758-770. (Year: 2015).

United States Patent & Trademark Office, Final Office Action received for U.S. Appl. No. 15/450,486, dated Dec. 22, 2020, 19 pages, US.

United States Patent & Trademark Office, Non-Final Office Action for received U.S. Appl. No. 15/450,486, dated Mar. 5, 2020, 26 pages, US.

United States Patent & Trademark Office, Non-Final Office Action received for U.S. Appl. No. 15/450,486, dated Sep. 3, 2020, 17 pages, US.

United States Patent & Trademark Office, Notice of Allowance received for U.S. Appl. No. 15/450,486, dated Apr. 13, 2021, 15 pages, US.

United States Patent and Trademark Office, Non-Final Office Action received for U.S. Appl. No. 15/450,486, dated Sep. 25, 2019, 34 pages, US.

\* cited by examiner

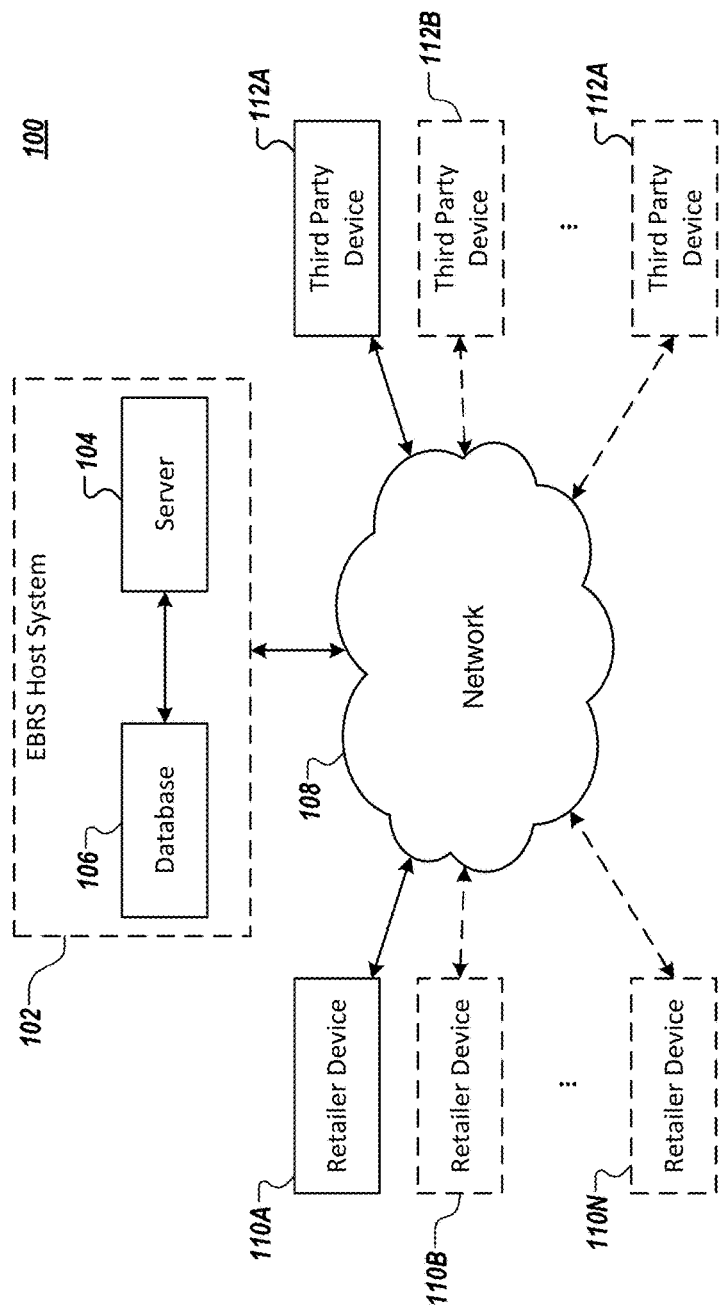
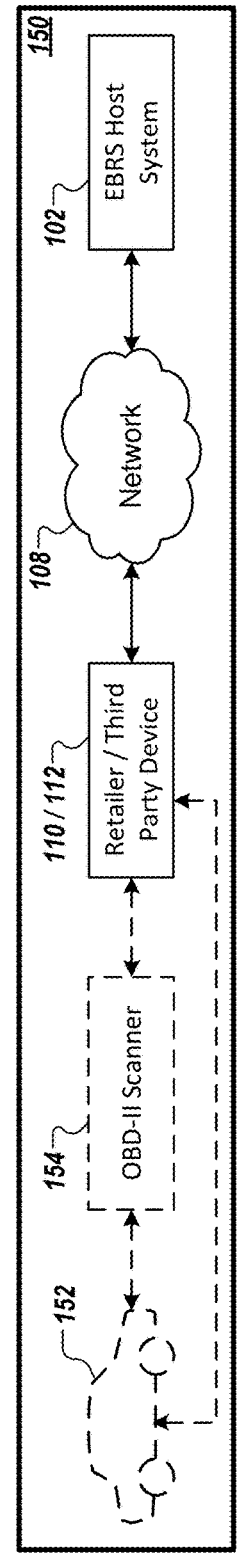

| Health Report | | ✕ |
|---|---|---|
| Vehicle Info | Year: | Mileage Reported: |
| | Make: | VIN #: |
| | Model: | Engine: |
| Diagnostic Trouble Codes (DTC) Solution [hyperlink] | | Primary DTC |
| Overview ... | | |

604 {

| Fix Information | Settings 606 |
|---|---|
| Job Complexity | |
| This job takes an average of ___ hours of labor. ___% of customers attempting a DIY fix returned the parts. | } 608 |
| Do-It-Yourself (DIY) Costs | |
| Given your current quality and comprehensiveness selections, the cost of parts for this repair is $____. The cost of parts plus needed tools for this repair is $____. Costs for this job range from $____ to $____. | } 610 |
| Do-It-For-Me (DIFM) Costs | |
| Based on your quality and comprehensiveness selections, repair estimates for this job range from $____ to $____. | } 612 |

FIG. 6B

SYSTEMS AND APPARATUSES FACILITATING A DO-IT-YOURSELF EXPERIENCE-BASED REPAIR SOLUTION

CROSS-REFERENCE TO RELATED APPLICATIONS

This application claims priority to U.S. application Ser. No. 15/450,486, filed on Mar. 6, 2017, which claims the benefit of U.S. Provisional Patent Application No. 62/305,643, filed Mar. 9, 2016, the contents of all of which are incorporated herein by reference in their entirety.

TECHNOLOGICAL FIELD

Example embodiments of the present invention relate generally to vehicular repairs and, more particularly, to a system and apparatuses facilitating repairs by Do-It-Yourself (DIY) consumers.

BACKGROUND

Applicant has discovered problems with traditional methods by which retailers and DIY consumers interact. Many of these problems are overcome using example embodiments described in detail below, which rely upon previously unavailable technological improvements to address pain points and minimize administrative hassle.

BRIEF SUMMARY

As described herein, example embodiments provide an Experience-Based Repair Solution (EBRS) platform addressing the DIY consumer market segment and providing example systems and apparatuses facilitating a DIY EBRS solution.

In a first example embodiment, a method is provided for facilitating Do-It-Yourself (DIY) repairs. The method includes receiving, by an experience-based repair service (EBRS) host system, vehicle diagnostic information identifying one or more vehicle problems, and evaluating, by the EBRS host system, the vehicle diagnostic information. The method further includes generating, by the EBRS host system and based on the evaluation of the vehicle diagnostic information, required part types and required tools for addressing the one or more vehicle problems, generating, by the EBRS host system and based on the evaluation of the vehicle diagnostic information, recommended part types for addressing the one or more vehicle problems, and causing presentation of an interface facilitating purchase of required parts from each of the generated required part types, the required tools, and recommended parts from each of the generated recommended part types.

In some embodiments, the method includes generating complexity information relating to each of the one or more vehicle problems, wherein the complexity information identifies an estimated time period needed to complete repair of each of the one or more vehicle problems, and causing presentation of the generated complexity information. In some such embodiments, generating complexity information relating to a vehicle problem includes retrieving, by the EBRS host system, historical information regarding frequency of returns of parts and tools associated with the vehicle problem, and assigning a level of complexity to the vehicle problem based on the frequency of returns. Alternatively, generating complexity information relating to a vehicle problem may include calculating an estimated time to fix the vehicle problem. In one such embodiment, calculating the estimated time to fix the vehicle problem comprises retrieving, by the EBRS host system, historical information regarding time periods until subsequent activity by consumers having purchased parts relating to the vehicle problem, and averaging the time periods until the subsequent activity, wherein the estimated time to fix the vehicle problem is based on the averaging of the time periods until the subsequent activity. This historical information may include vehicle diagnostic information retrieved from vehicles that identifies when the vehicle problems are fixed. In another such embodiment, calculating the estimated time to fix the vehicle problem comprises causing dissemination of customer surveys corresponding to vehicle problems after each purchase, wherein the customer surveys request information regarding the estimated time to fix the vehicle problem, and receiving, by the EBRS host system, consumer responses to the customer surveys, wherein the estimated time to fix the vehicle problem is based on the received consumer responses.

In some embodiments, the method includes causing presentation of an interface facilitating selection from a plurality of quality tiers, and receiving, by the EBRS host system, selection of a quality tier from the plurality of quality tiers, wherein prioritization of the required parts from each of the generated required part types and the recommended parts from each of the generated recommended part types is based on the selected quality tier.

In some embodiments, the method further includes causing presentation of an interface facilitating selection from a plurality of comprehensiveness tiers, and receiving, by the EBRS host system, selection of a comprehensiveness tier from the plurality of comprehensiveness tiers, wherein the recommended part types are generated based on the selected comprehensiveness tier.

In some embodiments, the EBRS host system causes the presentation of the interface facilitating purchase of the required parts, the required tools, and the recommended parts in response to an application programming interface (API) call from a third party application.

In some embodiments, the method includes identifying orders of priority of the required parts and the recommended parts, wherein causing presentation of the interface facilitating purchase of the required parts, the required tools, and the recommended parts includes causing presentation of the required parts and the recommended parts in the corresponding orders of priority. In some such embodiments, the orders of priority of the required parts and the recommended parts are based on one or more of: price, inventory levels, vendor-negotiated deals, geography, or historical rates of part returns.

In some embodiments, the method includes receiving, by the EBRS host system, vehicle diagnostic information after making repairs recommended by the EBRS host system to address one or more vehicle problems. The method further includes determining, by the EBRS host system and based on the evaluation of the vehicle diagnostic information, whether any vehicle problems exist, and storing an indication of one or more effects of the repairs. In some such embodiments, the indication of one or more effects of the repairs is based on one or more of: vehicle problems existed before and after the repairs, records of part returns, or user input.

In some embodiments, the method includes transmitting, by the EBRS host system, a survey to gather input regarding vehicle problems from a user after determining, by the EBRS host system and based on the evaluation of the vehicle diagnostic information received after making repairs recommended by the EBRS host system, whether any vehicle problems exist. The method further includes receiving, by the EBRS host system, feedback from the user in response to transmission of the user survey, determining, by the EBRS host system and based on the evaluation of the user feedback, whether any vehicle problems exist, and storing, by the EBRS host system, an indication of one or more effects of the repairs.

In a second example embodiment, an apparatus is provided for facilitating Do-It-Yourself (DIY) repairs. The apparatus includes at least one processor and at least one memory storing computer-executable instructions, that, when executed by the at least one processor, cause the apparatus to receive vehicle diagnostic information identifying one or more vehicle problems, and evaluate the vehicle diagnostic information. The computer-executable instructions, when executed by the at least one processor, further cause the apparatus to generate, based on the evaluation of the vehicle diagnostic information, required part types and required tools for addressing the one or more vehicle problems, generate, based on the evaluation of the vehicle diagnostic information, recommended part types for addressing the one or more vehicle problems, and cause presentation of an interface facilitating purchase of required parts from each of the generated required part types, the required tools, and recommended parts from each of the generated recommended part types.

In some embodiments, the computer-executable instructions, when executed by the at least one processor, further cause the apparatus to generate complexity information relating to each of the one or more vehicle problems, wherein the complexity information identifies an estimated time period needed to complete repair of each of the one or more vehicle problems, and causing presentation of the generated complexity information. In some such embodiments, generating complexity information relating to a vehicle problem includes retrieving historical information regarding frequency of returns of parts and tools associated with the vehicle problem, and assigning a level of complexity to the vehicle problem based on the frequency of returns. Alternatively, generating complexity information relating to a vehicle problem may include calculating an estimated time to fix the vehicle problem. In one such embodiment, calculating the estimated time to fix the vehicle problem comprises retrieving historical information regarding time periods until subsequent activity by consumers having purchased parts relating to the vehicle problem, and averaging the time periods until the subsequent activity, wherein the estimated time to fix the vehicle problem is based on the averaging of the time periods until the subsequent activity. This historical information may include vehicle diagnostic information retrieved from vehicles that identifies when the vehicle problems are fixed. In another such embodiment, calculating the estimated time to fix the vehicle problem comprises causing dissemination of customer surveys corresponding to vehicle problems after each purchase, wherein the customer surveys request information regarding the estimated time to fix the vehicle problem, and receiving, by the EBRS host system, consumer responses to the customer surveys, wherein the estimated time to fix the vehicle problem is based on the received consumer responses.

In some embodiments, the computer-executable instructions, when executed by the at least one processor, further cause the apparatus to cause presentation of an interface facilitating selection from a plurality of quality tiers, and receive selection of a quality tier from the plurality of quality tiers, wherein prioritization of the required parts from each of the generated required part types and the recommended parts from each of the generated recommended part types is based on the selected quality tier.

In some embodiments, the computer-executable instructions, when executed by the at least one processor, further cause the apparatus to cause presentation of an interface facilitating selection from a plurality of comprehensiveness tiers, and receive selection of a comprehensiveness tier from the plurality of comprehensiveness tiers, wherein the recommended part types are generated based on the selected comprehensiveness tier.

In some embodiments, the apparatus causes the presentation of the interface facilitating purchase of the required parts, the required tools, and the recommended parts in response to an application programming interface (API) call from a third party application In some embodiments, the computer-executable instructions, when executed by the at least one processor, further cause the apparatus to identify orders of priority of the required parts and the recommended parts, wherein causing presentation of the interface facilitating purchase of the required parts, the required tools, and the recommended parts includes causing presentation of the required parts and the recommended parts in the corresponding orders of priority. In some such embodiments, the orders of priority of the required parts and the recommended parts are based on one or more of: price, inventory levels, vendor-negotiated deals, geography, or historical rates of part returns.

In some embodiments, the computer-executable instructions, when executed by the at least one processor, further cause the apparatus to receive vehicle diagnostic information after making repairs recommended by the apparatus to address one or more vehicle problems. The computer-executable instructions, when executed by the at least one processor, further cause the apparatus to determine, based on the evaluation of the vehicle diagnostic information, whether any vehicle problems exist, and store an indication of one or more effects of the repairs. In some such embodiments, the indication of one or more effects of the repairs is based on one or more of: vehicle problems existed before and after the repairs, records of part returns, or user input.

In some embodiments, the computer-executable instructions, when executed by the at least one processor, further cause the apparatus to transmit a survey to gather input regarding vehicle problems from a user after determining, based on the evaluation of the vehicle diagnostic information received after making repairs recommended by the apparatus, whether any vehicle problems exist. The computer-executable instructions, when executed by the at least one processor, may further cause the apparatus to receive feedback from the user in response to transmission of the user survey, determine, based on the evaluation of user feedback, whether any vehicle problems exist, and store an indication of one or more effects of the repairs.

In a third example embodiment, a computer program product at least one non-transitory computer-readable storage medium is provided for facilitating Do-It-Yourself (DIY) repairs. The at least one non-transitory computer-readable storage medium stores computer-executable instructions that, when executed, cause an apparatus to receive vehicle diagnostic information identifying one or more vehicle problems, and evaluate the vehicle diagnostic information. The computer-executable instructions, when executed, further cause the apparatus to generate, based on the evaluation of the vehicle diagnostic information, required part types and required tools for addressing the one or more vehicle problems, generate, based on the evaluation of the vehicle diagnostic information, recommended part types for addressing the one or more vehicle problems, and cause presentation of an interface facilitating purchase of required parts from each of the generated required part types, the required tools, and recommended parts from each of the generated recommended part types.

In some embodiments, the computer-executable instructions, when executed, further cause the apparatus to generate complexity information relating to each of the one or more vehicle problems, wherein the complexity information identifies an estimated time period needed to complete repair of each of the one or more vehicle problems, and causing presentation of the generated complexity information. In some such embodiments, generating complexity information relating to a vehicle problem includes retrieving historical information regarding frequency of returns of parts and tools associated with the vehicle problem, and assigning a level of complexity to the vehicle problem based on the frequency of returns. Alternatively, generating complexity information relating to a vehicle problem may include calculating an estimated time to fix the vehicle problem. In one such embodiment, calculating the estimated time to fix the vehicle problem comprises retrieving historical information regarding time periods until subsequent activity by consumers having purchased parts relating to the vehicle problem, and averaging the time periods until the subsequent activity, wherein the estimated time to fix the vehicle problem is based on the averaging of the time periods until the subsequent activity. This historical information may include vehicle diagnostic information retrieved from vehicles that identifies when the vehicle problems are fixed. In another such embodiment, calculating the estimated time to fix the vehicle problem comprises causing dissemination of customer surveys corresponding to vehicle problems after each purchase, wherein the customer surveys request information regarding the estimated time to fix the vehicle problem, and receiving consumer responses to the customer surveys, wherein the estimated time to fix the vehicle problem is based on the received consumer responses.

In some embodiments, the computer-executable instructions, when executed, further cause the apparatus to cause presentation of an interface facilitating selection from a plurality of quality tiers, and receive selection of a quality tier from the plurality of quality tiers, wherein prioritization of the required parts from each of the generated required part types and the recommended parts from each of the generated recommended part types is based on the selected quality tier.

In some embodiments, the computer-executable instructions, when executed, further cause the apparatus to cause presentation of an interface facilitating selection from a plurality of comprehensiveness tiers, and receive selection of a comprehensiveness tier from the plurality of comprehensiveness tiers, wherein the recommended part types are generated based on the selected comprehensiveness tier.

In some embodiments, the computer-executable instructions, when executed, further cause the apparatus to cause the presentation of the interface facilitating purchase of the required parts, the required tools, and the recommended parts in response to an application programming interface (API) call from a third party application In some embodiments, the computer-executable instructions, when executed, further cause the apparatus to identify orders of priority of the required parts and the recommended parts, wherein causing presentation of the interface facilitating purchase of the required parts, the required tools, and the recommended parts includes causing presentation of the required parts and the recommended parts in the corresponding orders of priority. In some such embodiments, the orders of priority of the required parts and the recommended parts are based on one or more of: price, inventory levels, vendor-negotiated deals, geography, or historical rates of part returns.

In some embodiments, the computer-executable instructions, when executed, further cause the apparatus to receive vehicle diagnostic information after making repairs recommended by the apparatus to address one or more vehicle problems. The computer-executable instructions, when executed, further cause the apparatus to determine, based on the evaluation of the vehicle diagnostic information, whether any vehicle problems exist, and store an indication of one or more effects of the repairs. In some such embodiments, the indication of one or more effects of the repairs is based on one or more of: vehicle problems existed before and after the repairs, records of part returns, or user input.

In some embodiments, the computer-executable instructions, when executed, further cause the apparatus to transmit a survey to gather input regarding vehicle problems from a user after determining, based on the evaluation of the vehicle diagnostic information received after making repairs recommended by the apparatus, whether any vehicle problems exist. The computer-executable instructions, when executed, further cause the apparatus to receive feedback from the user in response to transmission of the user survey, determine, based on the evaluation of user feedback, whether any vehicle problems exist, and store an indication of one or more effects of the repairs.

In another example embodiment, a method is provided for facilitating Do-It-Yourself (DIY) repairs. The method includes receiving vehicle diagnostic information identifying one or more vehicle problems, transmitting the received vehicle diagnostic information to an EBRS host system, receiving, from the EBRS host system, required part types and required tools for addressing the one or more vehicle problems, receiving, from the EBRS host system, recommended part types for addressing the one or more vehicle problems, and causing presentation of an interface facilitating purchase of required parts from each of the generated required part types, the required tools, and recommended parts from each of the generated recommended part types.

In some embodiments, receiving vehicle diagnostic information identifying one or more vehicle problems includes one or more of: receiving, via communications circuitry, diagnostic trouble codes from an OBD-II scanner; receiving, via OBD-II scanning circuitry, diagnostic trouble codes from a vehicle; receiving, via input/output circuitry, user input; or receiving, from a memory, vehicle diagnostic information from a historical database.

In some embodiments, the method further includes receiving, from the EBRS host system, complexity information relating to each of the one or more vehicle problems, wherein the complexity information identifies an estimated time period needed to complete repair of each of the one or more vehicle problems, and causing presentation of the generated complexity information. In some such embodiments, the complexity information relating to a vehicle problem includes a level of complexity to the vehicle problem based on the frequency of returns. In other such embodiments, the complexity information relating to a vehicle problem includes an estimated time to fix the vehicle problem.

In some embodiments, the method further includes causing presentation of an interface facilitating selection from a plurality of quality tiers, receiving selection of a quality tier from the plurality of quality tiers, and transmitting the selected quality tier to the EBRS host system.

In some embodiments, the method further includes causing presentation of an interface facilitating selection from a plurality of comprehensiveness tiers, receiving selection of a comprehensiveness tier from the plurality of comprehensiveness tiers, and transmitting the selected comprehensiveness tier to the EBRS host system.

In some embodiments, the method includes receiving vehicle diagnostic information after making repairs recommended by the EBRS host system to address one or more vehicle problems, and transmitting the received vehicle diagnostic information to the EBRS host system.

In some embodiments, receiving vehicle diagnostic information after making repairs recommended by the EBRS host system to address one or more vehicle problems includes one or more of: receiving, via communications circuitry, diagnostic trouble codes from an OBD-II scanner; receiving, via OBD-II scanning circuitry, diagnostic trouble codes from a vehicle; receiving, via input/output circuitry, user input; or receiving, from a memory, vehicle diagnostic information from a historical database.

In some embodiments, the method includes receiving, from the EBRS host system, a survey to gather user input regarding vehicle problems, causing presentation of an interface facilitating collection of user feedback, and transmitting, to the EBRS host system, the user feedback in response to the received user survey.

In another example embodiment, an apparatus is provided for facilitating Do-It-Yourself (DIY) repairs. The apparatus includes at least one processor and at least one memory storing computer-executable instructions, that, when executed by the at least one processor, cause the apparatus to receive vehicle diagnostic information identifying one or more vehicle problems, transmit the received vehicle diagnostic information to an EBRS host system, receive, from the EBRS host system, required part types and required tools for addressing the one or more vehicle problems, receive, from the EBRS host system, recommended part types for addressing the one or more vehicle problems, and cause presentation of an interface facilitating purchase of required parts from each of the generated required part types, the required tools, and recommended parts from each of the generated recommended part types.

In some embodiments, receiving vehicle diagnostic information identifying one or more vehicle problems includes one or more of: receiving, via communications circuitry, diagnostic trouble codes from an OBD-II scanner; receiving, via OBD-II scanning circuitry, diagnostic trouble codes from a vehicle; receiving, via input/output circuitry, user input; or receiving, from a memory, vehicle diagnostic information from a historical database.

In some embodiments, the computer-executable instructions, when executed by the at least one processor, further cause the apparatus to receive, from the EBRS host system, complexity information relating to each of the one or more vehicle problems, wherein the complexity information identifies an estimated time period needed to complete repair of each of the one or more vehicle problems, and cause presentation of the generated complexity information. In some such embodiments, the complexity information relating to a vehicle problem includes a level of complexity to the vehicle problem based on the frequency of returns. In other such embodiments, the complexity information relating to a vehicle problem includes an estimated time to fix the vehicle problem.

In some embodiments, the computer-executable instructions, when executed by the at least one processor, further cause the apparatus to, cause presentation of an interface facilitating selection from a plurality of quality tiers, receive selection of a quality tier from the plurality of quality tiers, and transmit the selected quality tier to the EBRS host system.

In some embodiments, the computer-executable instructions, when executed by the at least one processor, further cause the apparatus to cause presentation of an interface facilitating selection from a plurality of comprehensiveness tiers, receive selection of a comprehensiveness tier from the plurality of comprehensiveness tiers, and transmit the selected comprehensiveness tier to the EBRS host system.

In some embodiments, the computer-executable instructions, when executed by the at least one processor, further cause the apparatus to receive vehicle diagnostic information after making repairs recommended by the EBRS host system to address one or more vehicle problems, and transmit the received vehicle diagnostic information to the EBRS host system.

In some embodiments, receiving vehicle diagnostic information after making repairs recommended by the EBRS host system to address one or more vehicle problems includes one or more of: receiving, via communications circuitry, diagnostic trouble codes from an OBD-II scanner; receiving, via OBD-II scanning circuitry, diagnostic trouble codes from a vehicle; receiving, via input/output circuitry, user input; or receiving, from a memory, vehicle diagnostic information from a historical database.

In some embodiments, computer-executable instructions, when executed by the at least one processor, further cause the apparatus to receive, from the EBRS host system, a survey to gather user input regarding vehicle problems, cause presentation of an interface facilitating collection of user feedback, and transmit, to the EBRS host system, the user feedback in response to the received user survey.

In another example embodiment, a computer program product comprising at least one non-transitory computer-readable storage medium is provided. The at least one non-transitory computer-readable storage medium stores computer-executable instructions that, when executed, cause an apparatus to receive vehicle diagnostic information identifying one or more vehicle problems, transmit the received vehicle diagnostic information to an EBRS host system, receive, from the EBRS host system, required part types and required tools for addressing the one or more vehicle problems, receive, from the EBRS host system, recommended part types for addressing the one or more vehicle problems, and cause presentation of an interface facilitating purchase of required parts from each of the generated required part types, the required tools, and recommended parts from each of the generated recommended part types.

In some embodiments, receiving vehicle diagnostic information identifying one or more vehicle problems includes one or more of: receiving, via communications circuitry, diagnostic trouble codes from an OBD-II scanner; receiving, via OBD-II scanning circuitry, diagnostic trouble codes from a vehicle; receiving, via input/output circuitry, user input; or receiving, from a memory, vehicle diagnostic information from a historical database.

In some embodiments, the computer-executable instructions, when executed, further cause the apparatus to receive, from the EBRS host system, complexity information relating to each of the one or more vehicle problems, wherein the complexity information identifies an estimated time period needed to complete repair of each of the one or more vehicle problems, and cause presentation of the generated complexity information. In some such embodiments, the complexity information relating to a vehicle problem includes a level of complexity to the vehicle problem based on the frequency of returns. In other such embodiments, the complexity information relating to a vehicle problem includes an estimated time to fix the vehicle problem.

In some embodiments, the computer-executable instructions, when executed, further cause the apparatus to cause presentation of an interface facilitating selection from a plurality of quality tiers, receive selection of a quality tier from the plurality of quality tiers, and transmit the selected quality tier to the EBRS host system.

In some embodiments, the computer-executable instructions, when executed, further cause the apparatus to cause presentation of an interface facilitating selection from a plurality of comprehensiveness tiers, receive selection of a comprehensiveness tier from the plurality of comprehensiveness tiers, and transmit the selected comprehensiveness tier to the EBRS host system.

In some embodiments, the computer-executable instructions, when executed, further cause the apparatus to receive vehicle diagnostic information after making repairs recommended by the EBRS host system to address one or more vehicle problems, and transmit the received vehicle diagnostic information to the EBRS host system.

In some embodiments, receiving vehicle diagnostic information after making repairs recommended by the EBRS host system to address one or more vehicle problems includes one or more of: receiving, via communications circuitry, diagnostic trouble codes from an OBD-II scanner; receiving, via OBD-II scanning circuitry, diagnostic trouble codes from a vehicle; receiving, via input/output circuitry, user input; or receiving, from a memory, vehicle diagnostic information from a historical database.

In some embodiments, the computer-executable instructions, when executed, further cause the apparatus to receive, from the EBRS host system, a survey to gather user input regarding vehicle problems, cause presentation of an interface facilitating collection of user feedback, and transmit, to the EBRS host system, the user feedback in response to the received user survey.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings, which are not necessarily drawn to scale:

FIG. 1A shows an example system diagram, in accordance with an example embodiment of the present invention.

FIG. 1B illustrates an example sequence in which various elements involved in the EBRS platform interact, in accordance with an example embodiment of the present invention.

FIGS. 5A, 5B, and 5C illustrate a series of user interfaces presented for navigating from a main landing page associated with the EBRS platform to select a health report for a vehicle, in accordance with some example embodiments described herein.

FIGS. 6A, 6B, and 6C illustrate a series of health report user interfaces presented by the EBRS host system in accordance with some example embodiments described herein.

DETAILED DESCRIPTION

Figure 2:
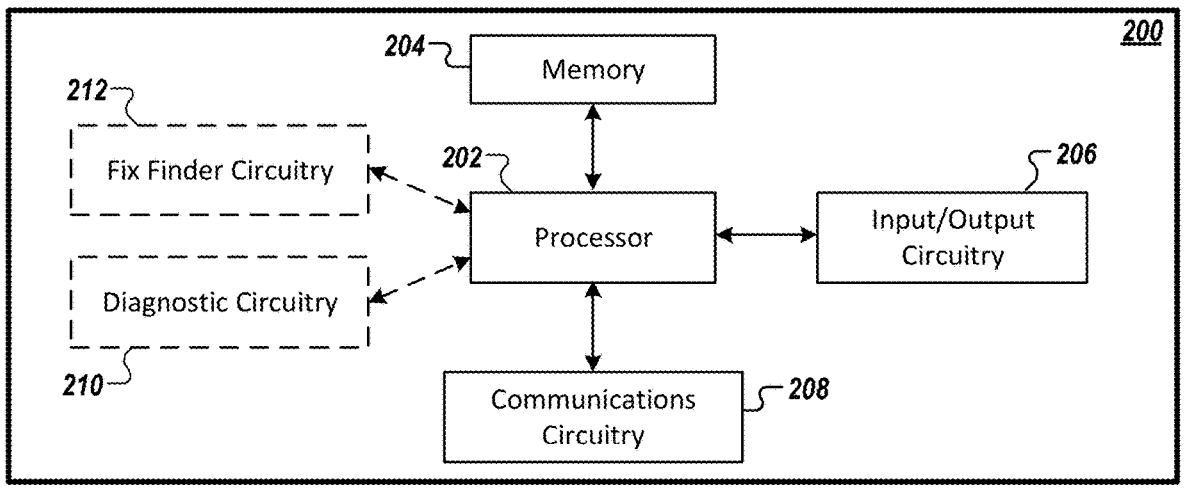
FIG. 2 illustrates a schematic block diagram of circuitry embodying an EBRS host system device, in accordance with some example embodiments described herein.

Some embodiments of the present invention will now be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention.

Overview

Embodiments disclosed herein illustrate an EBRS platform that serves heretofore unmet needs of the automotive consumer base. Retailers historically have always sold replacement vehicle parts. Others, such as mechanics, offer quotes for Do-It-For-Me (DIFM) repairs, but those quotes are often fixed beforehand or ballpark estimates that include the cost of labor. However, for those consumers who seek to manually repair their own vehicle, labor costs are irrelevant, and it would be useful to have additional guidance regarding what parts are needed, without the requirement to separately research an issue. It is often the case that DIY consumers are forced to learn what parts are needed by trial and error, thus resulting in a series of trips to the store for various part purchases, even though a well-informed consumer would only need one. Moreover, in many cases, certain tools or equipment are required to repair certain parts, and repair of certain parts may also necessitate the replacement or repair of other parts by virtue of their relative relationships within a vehicle. For instance, the repair of brake pads and brake rotors often go hand-in-hand. Similarly, a valve cover may need to be replaced when replacing or repairing its corresponding valve.

Accordingly, example embodiments of the EBRS platform disclosed herein are designed to provide DIY consumers with the information necessary to evaluate the costs and requirements of repairing damage to vehicles and to facilitate a DIY EBRS solution. To do this, example embodiments of the EBRS platform gather information about a target vehicle, such as information retrieved from a vehicle diagnostic system or vehicle telematics system, or information about the vehicle that is not retrieved from the vehicle itself but from a separate source such as a vehicle owner or a third party (collectively, this information about a target vehicle may be referred to herein as vehicle diagnostic information), generate necessary repair information based on the gathered vehicle diagnostic information, locate available parts and tools based on the repair information, and provide an interactive interface offering the opportunity to purchase the parts and tools needed to repair the target vehicle. This interactive interface may describe the problem, the necessary parts and tools to fix the problem, and the cost to purchase the parts and tools, and may further provide a consumer with the opportunity to buy the necessary parts. In some embodiments, this interface may present a health report include how-to instructions/videos, job difficulty or complexity, and estimated time for completion, an estimated DIY cost and possibly a Do-It-For-Me (DIFM) cost (adding in an estimated labor cost, which may be provided by one or more mechanics using a service estimate provided in advance or through a service request leveraging an Application Programming Interface (API) or similar process). This report may be provided to the customer located in a retail store (e.g., via a point-of-sale terminal the customer can view), or may be provided to the consumer's device, to a commercial device (e.g., a mechanic's device), or to a third party application with which the customer interacts.

In addition, a closed-loop feedback system that confirms the effectiveness of repairs recommended for DIY consumers to address one or more vehicle problems is very valuable for enhancing the service provided to the DIY consumers. Accordingly, example embodiments of the EBRS platform disclosed herein are also designed to collect feedback indicating one or more effects of the repairs recommended to DIY consumers. To do this, example embodiments of the EBRS platform gather vehicle diagnostic information about a target vehicle after making repairs recommended by the EBRS system to address one or more vehicle problems, determine whether any vehicle problems exist based on the gathered vehicle diagnostic information, and store an indication of one or more effects of the repairs. In some embodiments, an interactive interface may be provided to a user to collect user feedback regarding vehicle problems and effectiveness of the repairs for each problem, and additional indications of one or more effects of the repairs, based on the user feedback, may be stored. This interactive interface for user feedback may be provided to a customer located in a retail store, or may be provided to the consumer's device, to a commercial device, or to a third party application with which the customer interact.

While each of these operations are described here at a high level, example systems and apparatuses for implementing this concept are provided below along with more detailed descriptions of example operations performed by those systems and/or apparatuses to provide consumers with the ability to utilize the example EBRS platforms described herein.

System Architecture

Methods, apparatuses, and computer program products of the present invention may be embodied by any of a variety of devices. Example embodiments may include a plurality of networked devices, such as an EBRS host system, retailer devices, third party devices, and/or other network entities, configured to operate in tandem. Example embodiments may include any of a variety of mobile terminals, such as a portable digital assistant (PDA), mobile telephone, smartphone, laptop computer, tablet computer, vehicle on-board computer, or any combination of the aforementioned devices. Similarly, the example embodiments may additionally or alternatively include any of a variety of fixed terminals, such as desktop computers, mainframe devices, kiosks or the like.

FIG. 1A discloses an example computing system 100, which may be referred to herein as the EBRS platform, and within which embodiments of the present invention may operate. As illustrated, an EBRS host system 102 may be connected to a network 108 (e.g., the Internet, or the like) that the EBRS host system 102 utilizes to communicate with a series of retailer devices 110A through 110N. Consumers, vendors, manufacturers, service providers, and the like may interact with the EBRS host system 102 via the network 108 using a series of third party devices 112A through 112N. The EBRS host system 102 may comprise a server 104 in communication with a database 106, which may be referred to as an affinity database.

The server 104 may be embodied as a computer or computers as known in the art. The server 104 may provide for transmission of notification messages among various devices, including but not necessarily limited to the retailer devices 110A-110N, the third party devices 112A-112N, and the database 106. For example, the server 104 may be operable to receive and process notification messages provided by one or more retailer devices 110 and to deliver notification messages to retailer devices 110A-110N and/or third party devices 112A-112N.

The database 106 may be stored on one or more data storage devices, such as a Network Attached Storage (NAS) device, or as a separate database server or servers. Moreover, while referred to in the singular throughout this disclosure for clarity, it should be understood that database 106 may in some example embodiments comprise a series of databases. As one example using a series of databases, each database in the series may store a discrete type of information from the other databases in the series. The database 106 includes information accessed and stored by the server 104 to facilitate the operations of the EBRS host system 102. In this regard, database 106 may comprise a proprietary set of "fix information" that is updated based on expert curation, historical information, feedback information, and manufacturer updates. This fix information may correlate vehicle diagnostic information to a problem, and may further identify one or more parts that must be replaced to repair each problem. In this regard, the fix information may identify one or more tools needed to complete the repair, and may further provide repair information describing the steps for making the repair. In some embodiments, the retailer may offer a "loaner tool" program providing a consumer with access needed tools without the requirement to purchase those tools outright. In addition, for each problem, the fix information may also include an identification of recommended parts that should be considered when making the repair. To generate this fix information, the database 106 may store information regarding the various vendors providing parts and/or tools, where the parts and/or tools from each vendor can be purchased, and the cost of purchasing each of the identified parts and/or tools from the various locations. Where the database 106 comprises a series of databases, this vendor information may be stored in a separate database in the series from other information stored in the series of databases.

In some embodiments, the database 106 may utilize a number of security and privacy measures to reduce the possibility that consumer or merchant data is leaked to unauthorized parties. In this regard, some or all of the retailer devices 110A-112N and third party devices 112A-112N may utilize password protected authentication to access the EBRS host system 102 and the transmission of data may be encrypted when possible. In some embodiments, this authentication-related information may be stored in a system (not shown in FIG. 1A) that is remote from the EBRS host system 102.

Moreover, the database 106 may store accounts for retailers and third parties that enable retailers and third parties to log into and utilize the EBRS platform provided by the EBRS host system 102 via retailer devices 110A-110N and third party devices 112A-112N, respectively. The database 106 may store account information provided by the various account holders, but may store information harvested about each account holder as well, such as information gathered from clickstream data, purchasing histories, return histories, account activity, retailer inventory levels, and the like. Where the database 106 comprises a series of databases, this account-related information may be stored in a separate database in the series from other information stored in the series of databases.

For instance, for a retailer having a location in Cleveland, Ohio, the database 106 may store a set of information regarding the retailer, including its specific location, sales activity, and historical snapshots of inventory information harvested from the retailer over time. Moreover, when purchases are made via the EBRS platform, the database 106 may store customer demographic data for each retailer that provides insight into the types of consumers who may visit the retailer.

As another example, for a consumer that has an account with the EBRS platform, the database 106 may store contextual information that may be useful for improving that consumer's experience interacting with the EBRS platform. For instance, this contextual information may identify the physical location of the consumer when that consumer accesses the EBRS platform (e.g., whether the consumer is at a retail location or a consumer device, whether the consumer accesses the platform from varied geographical locations, or the like). Or regarding the consumer's activity interacting with the EBRS platform, the database 106 may store a purchase history, return history, activity frequency, indication of effects of past repairs, user feedback, or the like that is harvested from the consumer's interaction with the EBRS platform.

More broadly, the database 106 may also store other historical information that need not be directly tied to any individual or any specific device, but which can still be utilized for predictive analysis. This historical information may include cross-consumer and/or cross-retailer purchase information, vehicle diagnostic information, an indication of effects of repairs for one or more vehicle problems of a vehicle, and/or clickstream information. Similarly, the historical information may aggregate regional, national, and/or global information regarding part returns, reviews, consumer surveys, an indication of effects of past repairs, or the like that may be gathered from third party interactions with the EBRS platform.

The retailer devices 110A-110N may be embodied by any computing devices known in the art. Although referred to herein as "retailer devices," it should be understood that these devices 110A-110N may in some embodiments be employed in a broader context than merely with regard to retail stores. For instance, while described in connection with retail stores, the term "retailer device" carries intuitive meaning. However, when the technology platform is utilized in alternative contexts (e.g., by an e-commerce provider that does not have a brick and mortar retail location), devices 110A-110N may be operated by employees or independent contractors associated with an organization that is not traditionally referred to as a "retailer." Despite the fact that the technology platform can be utilized by those that may not traditionally be designated as retailers, the terms "retailer" and "retailer device" are used herein for the sake of simplicity.

The retailer devices 110A-110N may transmit messages to the server 104 in various forms and via various methods. For example, the retailer devices 110A-110N may include kiosks, desktop computers, laptop computers, smartphones, netbooks, tablet computers, wearable devices, or the like. The information may be provided through various sources associated with each of these respective devices.

In some embodiments, a retailer device 110 may execute an "app" to interact with the EBRS host system 102, other retailer devices, and/or third party devices 112A-112N. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows®. These platforms typically provide frameworks that allow apps to communicate with one another and with particular hardware and software components of mobile devices. For example, the mobile operating systems named above provide frameworks for interacting with location services circuitry, wired and wireless network interfaces, user contacts, and other applications in a manner that allows for improved interactions between apps while also preserving the privacy and security of individual users. Communication with hardware and software modules executing outside of the app is typically provided via APIs provided by the mobile device operating system.

In embodiments in which a retailer device 110 is not a mobile device but comprises a desktop computer, laptop computer, or the like, the retailer device 110 may execute a more traditional software application facilitating the functionality described above, such as a web browser. As an example, a computer monitor may be mounted to the retailer's parts counter in a rotatable or movable fashion so that the retailer can show the web browser to a customer or mechanic on the other side of the counter. As yet another example, in some embodiments (e.g., when the retailer device 110 comprises a kiosk located with a retail facility), a retailer device 110 may include special-purpose hardware or firmware designed to interface with the EBRS host system 102 or third party device 112 in a purpose-built device having a primary purpose of communicating with the EBRS host system 102.

The third party devices 112A-112N may be any computing devices known in the art and operated by a third party. These devices are referred to herein as "third party devices" for the sake of inclusiveness, because one goal of several example embodiments is the engagement of a wide variety of entities. Accordingly, although a primary user of a third party device 112 may be a consumer, example embodiments described herein also contemplate use of third party devices 112 by business partners, suppliers, insurance companies, or other interested parties.

Each of the third party devices 112A-112N may include a computing device accessing a web site designed to provide merchant access (e.g., a smartphone, PDA, or desktop computer configured to access a web page via a browser using a set of merchant account credentials). Each of the third party devices 112A-112N may interact with the EBRS host system 102 and retailer devices 110A-110N. In this regard, the third party devices 112A-112N may provide information to the EBRS host system 102 and/or the retailer devices 112A-112N in various forms and via various methods. Similarly, the third party devices 112A-112N may receive transmissions from the EBRS host system 102 and/or one or more retailer devices 110A-110N.

Like the retailer devices 110A-110N, the third party devices 112A-112N may be embodied by any computing devices known in the art. The third party devices 112A-112N may transmit messages to the server 104 in various forms and via various methods. For example, the third party devices 112A-112N may include desktop computers, laptop computers, smartphones, netbooks, tablet computers, wearable devices, or the like. Similarly to the retailer environment, a computer monitor may be mounted to a third party's desk or counter in a rotatable or movable fashion so that the third party can show the web browser to a customer or mechanic on the other side of the counter or desk. The information may be provided through various sources on these devices.

Like the retailer devices 110A-110N, a third party device 112 may execute an "app" to interact with the EBRS host system 102, retailer devices 110A-110N, and/or with other third party devices 112A-112N. Additionally or alternatively, the third party devices 112A-112N may interact with the EBRS host system 102 or retailer device 110A-110N via a web browser. As yet another example, the third party devices 112A-112N may include various special-purpose hardware or firmware designed to interface with the EBRS host system 102 or an retailer device 110 (e.g., where a third party devices 112 is a purpose-built device offered for the primary purpose of communicating with the EBRS host system 102 or retailer device 110).

FIG. 1B discloses a diagram 150 illustrating one example sequence in which various elements of the system interact. As shown, the EBRS platform may be leveraged for performing DIY repairs on a vehicle 152. An On-Board Diagnostics (OBD)-II scanner 154 may be used to interrogate the vehicle 152 to harvest vehicle diagnostic codes (e.g., diagnostic trouble codes such as p-codes or the like), which can then be relayed to a retailer device 110 or third party device 112. It should be understood that OBD-II is an expanded set of standards and practices developed by the Society of Automotive Engineers (SAE) and compliance is mandatory throughout the US. In Europe and other countries such as Japan and Australia, similar standards have proliferated, and it will be understood that referencing scanner 154 as an "OBD-II scanner" is for ease of description, and that the scanner may in some embodiments be capable of interacting with vehicles operating under the relevant standards in other countries, or any other, standards for retrieving on-board diagnostic information from a vehicle. In some embodiments, a retailer device 110 or third party device 112 may itself incorporate an OBD-II scanner, thus removing the need for a separate OBD-II scanner to interrogate the vehicle 152 (hence the separate dotted line between the vehicle 152 and the box representing the retailer/third party device 110/112). It will be understood that OBD-II scanning is not a necessary element of all example embodiments, and the EBRS platform may in some circumstances be leveraged using only manually-entered data or data retrieved via a telematics system incorporated into the vehicle 152. Accordingly, as indicated by the dashed lines associated with the vehicle 152 and OBD-II scanner 154, the EBRS platform may in some instances may gather data directly from the vehicle 154 (thus not requiring OBD-II scanner 154), or in other embodiments may not even need to involve the vehicle 152, in which case data is gathered using only a retailer device 110 and the EBRS host system 102 or a third party device 112 and the EBRS host system 102.

Example Implementing Apparatuses

Having provided a high level description of the various devices employed by the example embodiments contemplated herein and an example illustration of how those devices may interact with each other, a low-level description of the various components comprising each of these devices will now be provided.

Turning first to FIG. 2, the server 104 included within the EBRS host system 102 may be embodied by one or more computing systems, such as apparatus 200 shown in FIG. 2. As illustrated in FIG. 2, the apparatus 200 includes a processor 202, a memory 204, input/output circuitry 206, communications circuitry 208, and may further include diagnostic circuitry 210 and fix finder circuitry 212. The apparatus 200 may be configured to execute the operations described above in connection with FIGS. 1A-1B and below in connection with FIGS. 5A-11. Although these components 202-212 are described with some functional descriptors, it should be understood that the particular implementations necessarily include the use of particular hardware. It should also be understood that certain of these components 202-212 may include similar or common hardware. For example, two sets of circuitry may both leverage use of the same processor, network interface, storage medium, or the like to perform their associated functions, such that duplicate hardware is not required for each set of circuitry (although embodiments using duplicated hardware may also be used). The use of the term "circuitry" as used herein with respect to components of the apparatus therefore includes particular hardware configured to perform the functions associated with the particular circuitry described herein.

Of course, while the term "circuitry" should be understood broadly to include hardware, in some embodiments, circuitry may also include software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, input/output circuitry 206 may provide user interface functionality, communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination of hardware with software, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments contemplated herein.

In some embodiments, the apparatus 200 may include input/output circuitry 206 that may, in turn, be in communication with processor 202 to provide output to a user and, in some embodiments, to receive an indication of user input. The input/output circuitry 206 may comprise a user interface and may include a display that may include a web user interface, a mobile application, a client device, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

In addition, the apparatus 200 may also comprise diagnostic circuitry 210, which includes hardware components designed to receive vehicle diagnosis information and identify required parts to replace and, in some embodiments, additional recommended parts to replace. Diagnostic circuitry 210 may utilize processor 202, memory 204, input/output circuitry 206, or any other hardware component included in the apparatus 200 to diagnose part failures. Diagnostic circuitry 210 may further utilize communications circuitry 208 to transmit the identified part information.

Diagnostic circuitry 210 may utilize processing circuitry, such as the processor 202, to facilitate performance of the above operations, and may utilize memory 204 to store the generated part information prior to (or, conceivably, after) transmission to a retailer device 110, third party device 112, or to the EBRS host system 102. It should be appreciated that, in some embodiments, diagnostic circuitry 210 may include a separate processor, specially configured field programmable gate array (FPGA), or application specific interface circuit (ASIC) to perform the above-described functions. Diagnostic circuitry 210 is therefore implemented using hardware components of the apparatus configured by either hardware or software for implementing these planned functions.

In addition, the apparatus 200 may also comprise fix finder circuitry 212, which includes hardware components designed to receive a series of part types and generate fix information based on the received part types. This fix information may include one or more parts falling within each part type and the respective purchase price and retailer availability for each of the one or more parts. Fix finder circuitry 212 may utilize processor 202, memory 204, input/output circuitry 206, or any other hardware component included in the apparatus 200 to diagnose part failures. Diagnostic circuitry 210 may further utilize communications circuitry 208 to transmit the verified fix to a retailer device 110 or third party device 112.

Fix finder circuitry 212 may utilize processing circuitry, such as the processor 202, to facilitate performance of the above operations, and may utilize memory 204 to store the generated fix information prior to (or, conceivably, after) transmission to a retailer device 110 or third party device 112. It should be appreciated that, in some embodiments, fix finder circuitry 212 may include a separate processor, specially configured field programmable gate array (FPGA), or application specific interface circuit (ASIC) to perform the above-described functions. Fix finder circuitry 212 is therefore implemented using hardware components of the apparatus configured by either hardware or software for implementing these planned functions.

Figure 3:
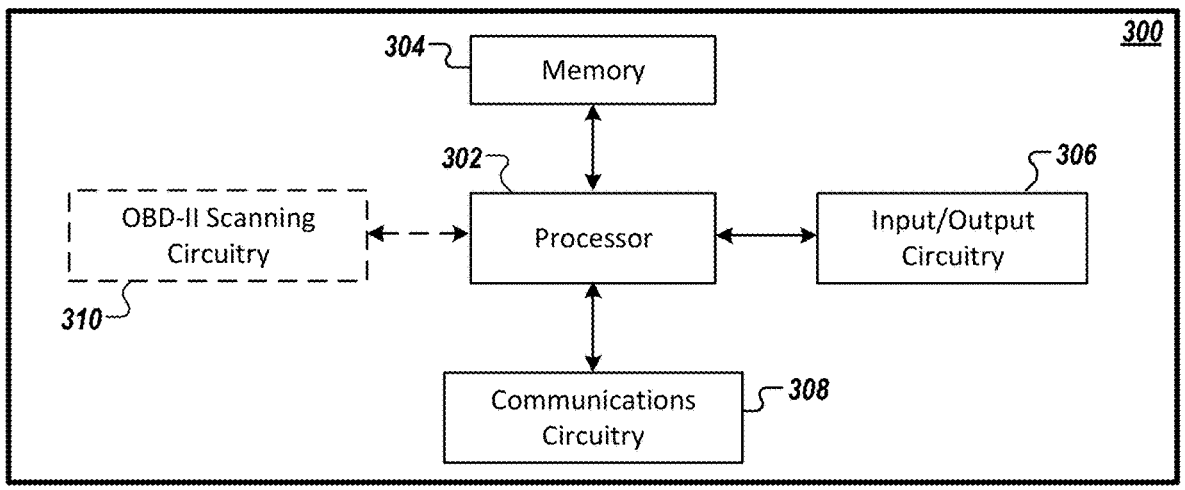
FIG. 3 illustrates a schematic block diagram of circuitry embodying a retailer device, in accordance with some example embodiments described herein.

Turning next to FIG. 3, an example hardware configuration of retailer devices 110A-110N is provided. These devices may be embodied by one or more computing systems, such as apparatus 300 shown in FIG. 3. As illustrated in FIG. 3, the apparatus 300 includes a processor 302, a memory 304, input/output circuitry 306, communications circuitry 308, and in various embodiments may further include OBD-II scanning circuitry 310.

As it relates to operations described in the present invention, the functioning of the processor 302, the memory 304, the input/output circuitry 306, and the communications circuitry 308 may be similar to the similarly named components described above with respect to FIG. 2, and for the sake of brevity, duplicative description of the mechanics of those components is omitted. It will be understood, however, that communications circuitry 308 may further be configured to facilitate communication with a vehicle telematics system of a vehicle, thereby facilitating the retrieval of vehicle diagnostic information from the vehicle. These device elements of apparatus 300, operating together, provide the apparatus 300 with the functionality necessary for the retailer devices 110A-110N to communicate with the EBRS host system 102, one or more other retailer devices 110A-110N, one or more third parties operating one or more third party devices 112A-112N, and in some embodiments, one or more vehicles.

In some embodiments, the apparatus 300 may also comprise OBD-II scanning circuitry 310, which includes hardware components designed to interface with a vehicle's OBD-II port and retrieve vehicle diagnostic codes therefrom. OBD-II scanning circuitry 310 may utilize input/output circuitry 306 or any other hardware component included in the apparatus 300 to perform these functions. OBD-II scanning circuitry 310 may utilize processing circuitry, such as the processor 302, to facilitate performance of the above operations, and may utilize memory 304 to store the retrieved vehicle diagnostic codes prior to (or, conceivably, after) transmission to another device (e.g., the EBRS host system 102). It should be appreciated that, in some embodiments, OBD-II scanning circuitry 310 may include a separate processor, specially configured field programmable gate array (FPGA), or application specific interface circuit (ASIC) to perform the above-described functions. OBD-II scanning circuitry 310 is therefore implemented using hardware components of the apparatus that are configured by either hardware or software. As noted previously during description of OBD-II scanner 154, Europe and other countries such as Japan and Australia utilize standards other than the OBD-II standard, and it will be understood that the OBD-II scanning circuitry 310 may comprise hardware and software components that facilitate interaction with vehicles operating under these or other standards for retrieving on-board diagnostic information from a vehicle.

Figure 4:
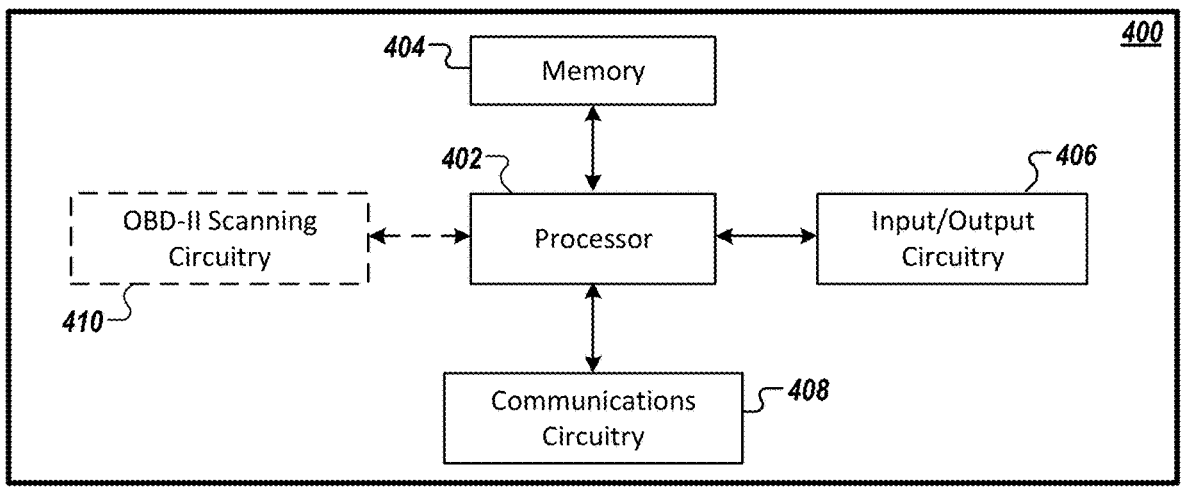
FIG. 4 illustrates a schematic block diagram of circuitry embodying a third party device, in accordance with some example embodiments described herein.

Finally, third party devices 112A-112N may be embodied by one or more computing systems, such as apparatus 400 shown in FIG. 4. As illustrated in FIG. 4, the apparatus 400 may include a processor 402, a memory 404, input/output circuitry 406, communications circuitry 408, and OBD-II scanning circuitry 410. As it relates to operations described in the present invention, the functioning of these elements may be similar to the similarly named components described above with respect to FIGS. 2 and/or 3 above, and for the sake of brevity, additional description of the mechanics of these components is omitted. Nevertheless, these device elements, operating together, provide the apparatus 400 with the functionality necessary to facilitate the communication of data (e.g., vehicle diagnostic information, user commands, information from other devices, or the like) between a third party utilizing the third party device(s) 112A-112N and any other devices connected via the EBRS platform.

As described above and as will be appreciated based on this disclosure, example embodiments may be configured as systems, methods, mobile devices, backend network devices, and/or the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

It should be appreciated, with respect to certain embodiments of the apparatuses described in FIGS. 2-4, computer program instructions and/or other type of code may be loaded onto a computer, processor or other programmable apparatus's circuitry to produce a machine, such that the computer, processor other programmable circuitry that execute the code on the machine create the means for implementing various functions described herein.

Having described specific components of an example server device (e.g., apparatus 200) that may embody the EBRS host system 102, an example retailer device 110 (e.g., apparatus 300), and an example third party device 112 (e.g., apparatus 400), example embodiments of the present invention are described below in connection with a series of demonstrative graphical user interfaces and flowcharts that describe some example operations performed variously by the EBRS host system 102, retailer devices 110A-110N and third party devices 112A-112N.

User Interfaces

Turning now to FIGS. 5A-5C, 6A-6C, 7, and 8A-8H, some user interfaces will now be described that illustrate various displays provided by a retailer device 110 to a retailer representative or a consumer, or by a third party device 112 to a consumer, as contemplated in some example embodiments. It should be understood that while some of the following interfaces are designed for display on a desktop monitor, other interfaces are intended to be implemented in a mobile environment on a mobile device (e.g., a smartphone, tablet, or the like). Moreover, although it may appear most natural for the EBRS host system 102 to design and generate the various interfaces that are displayed by the retailer device 110 (or third party device 112) described in this section, it will be understood that this is not the only implementation contemplated. Indeed, it may be the case that a third party app developer (who may, for instance, have a significant following) develops a mobile app that is particularly useful. The EBRS platform can then be leveraged via an API designed to enable ease of implementation via a variety of different apps. In this fashion, the EBRS platform may be leveraged by mobile apps having a significantly larger user base.

Figure 5A:
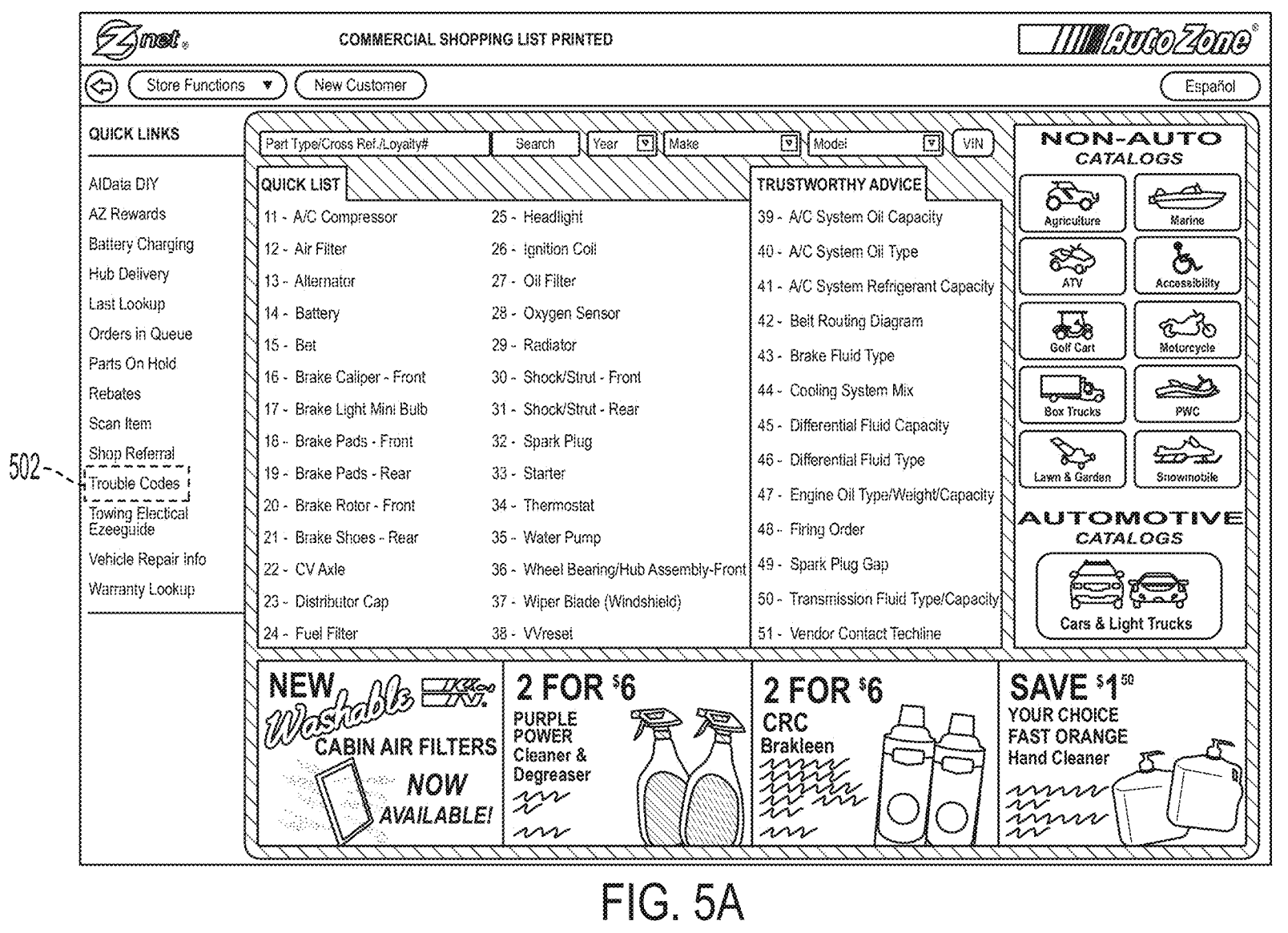
Figure 5B:
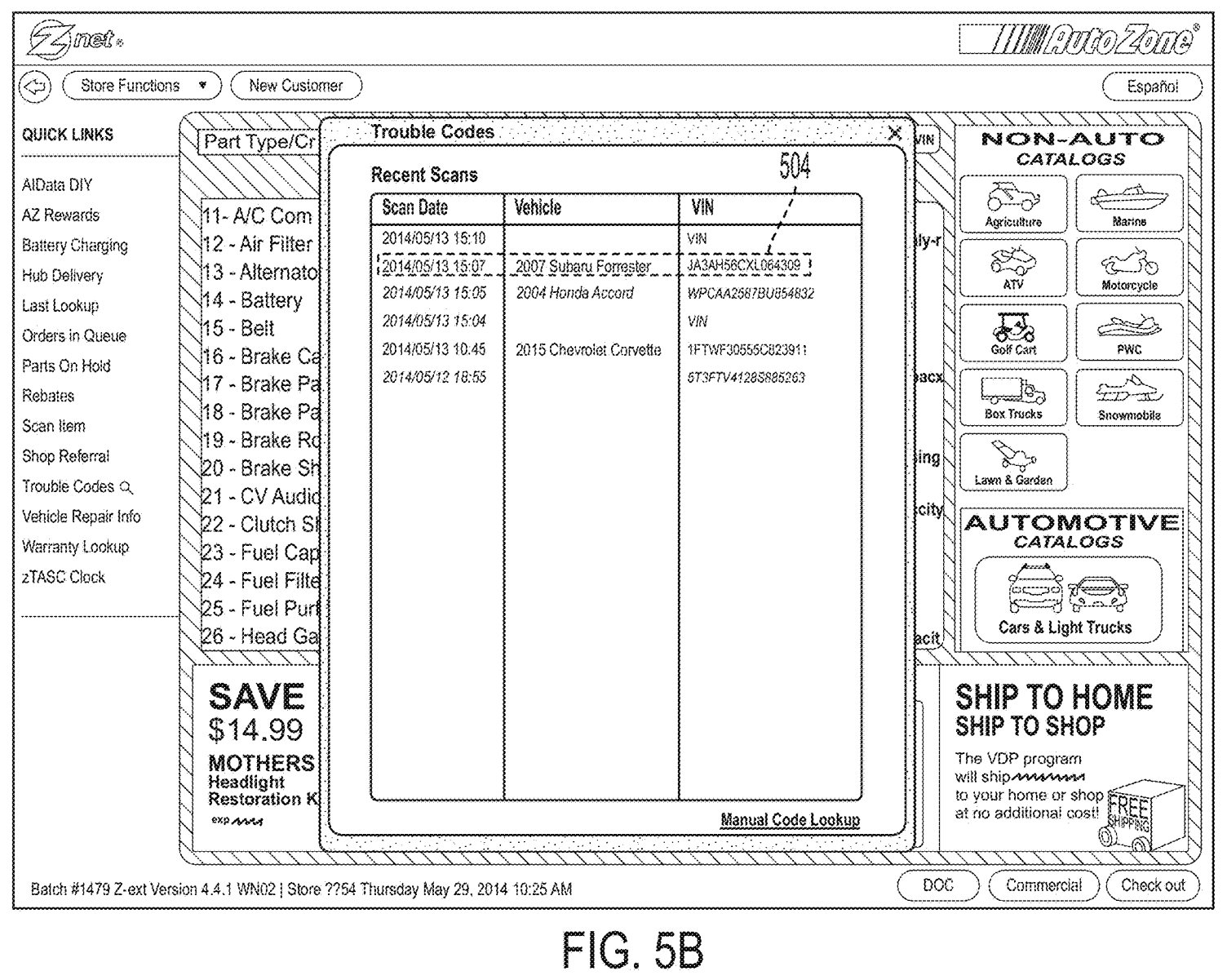
Figure 5C:
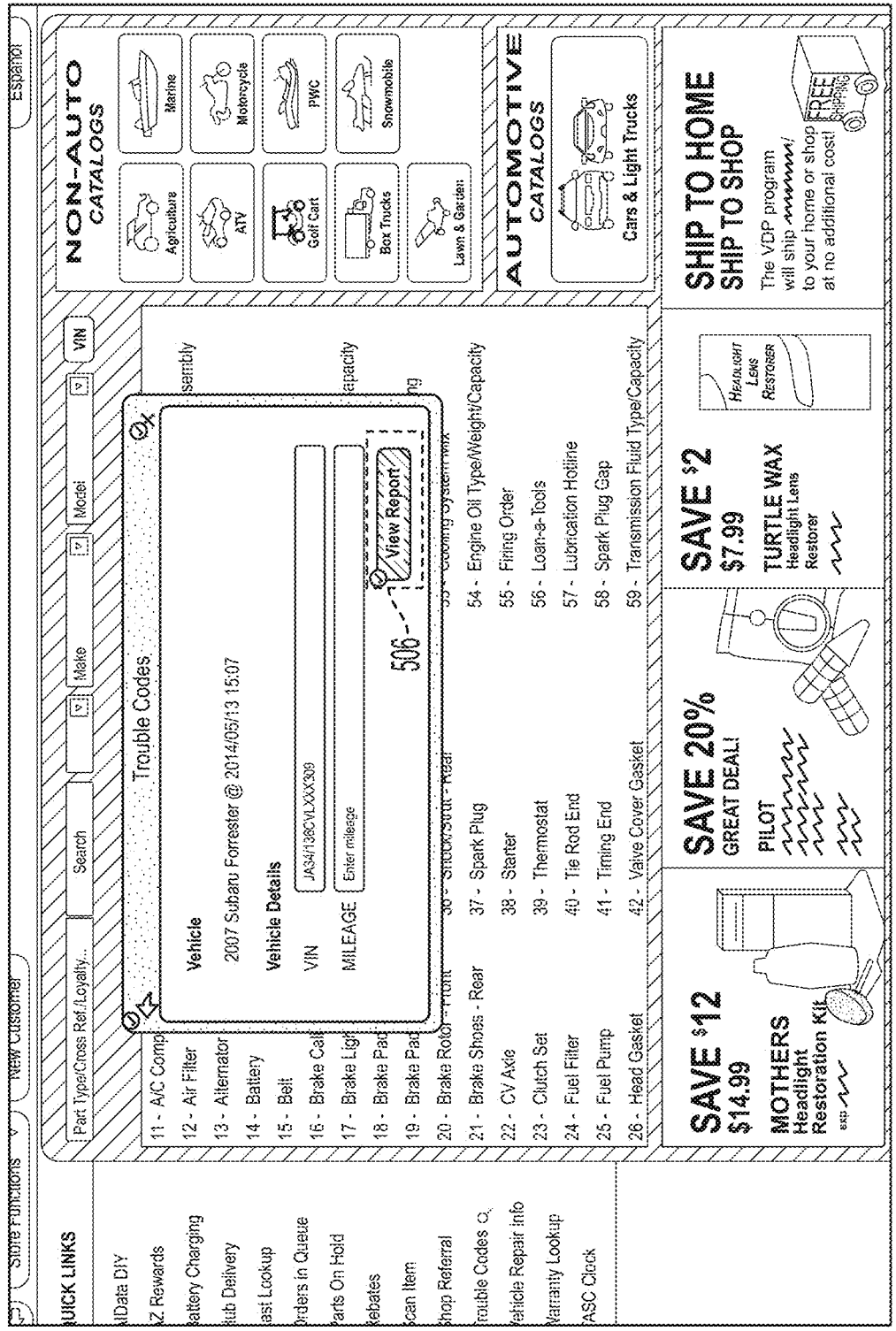

Turning first to FIGS. 5A-5C, a series of example user interfaces are described for navigating from a main landing page associated with the EBRS platform to select a health report for a vehicle. These example user interfaces may be provided by a host system to a retailer device 110 or a third party deice 112 for display to a consumer.

In FIG. 5A, an example interface is provided that may be considered a landing page for an e-commerce platform. While it will be understood that the landing page may present the basis for a wide range of interactions with an EBRS host system 102, example embodiments contemplated herein may utilize the "trouble codes" hyperlink 502. As shown in FIG. 5B, in response to selection of the hyperlink 502, the user is presented with a separate interface superimposed on the interface shown in FIG. 5A. This new interface illustrates a historical presentation of recent OBD-II scans of vehicles. The scans may have been performed by the device being used by the user (e.g., retailer device 110 or third party device 112), a peripheral OBD-II scanning device, or additionally or alternatively, the list of recent scans may list scans associated with the consumer's account stored by the EBRS host system 102 and displayed only if the consumer has logged into the account previously. From this interface, the consumer may select one of the recent scans (in this case, hyperlink 504 is selected, prompts the generation of another interface, one example of which is shown in FIG. 5C. Specifically, this interface shown in FIG. 5C presents the VIN number associated with the vehicle selected from FIG. 5B, and provides a field for entrance of the vehicle's mileage. Once entered, the consumer may select the "View Report" icon to be provided with a health report, as described in greater detail in connection with FIGS. 6A-6C.

Figure 6A:
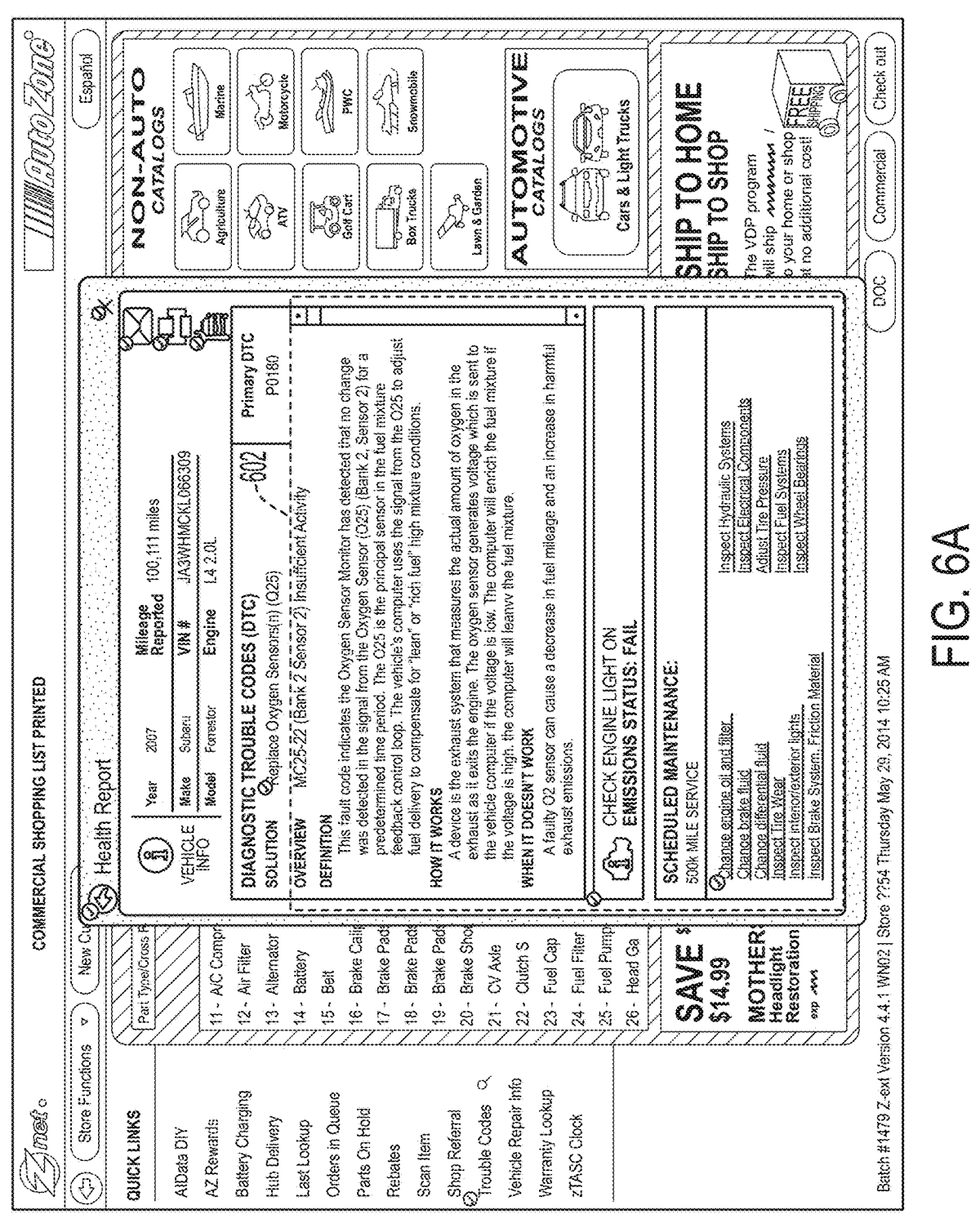

Turning next to FIG. 6A, an example health report is provided. The health report may act as a landing page having selectable hyperlinks directing the consumer to more-detailed pages describing specific information including how-to instructions/videos, job difficulty or complexity information, granular estimates of the time for completion, and part breakdowns and associated costs. As shown in FIG. 6A, the health report may be generated by the EBRS host system 102 and presented to a user operating either a retailer device 110 or a third party device 112. The health report illustrates vehicle demographic information, followed by diagnostic trouble code (DTC) information, followed by a set of information 602 describing the problem corresponding to the DTC information, providing engine light status information (e.g., in FIG. 6A, the health report indicates that the check engine light (CEL) is on), and providing scheduled maintenance information based on the received DTC information, VIN, and mileage information received via one or more of the interfaces displayed in FIGS. 5A-5C.

Figure 6C:
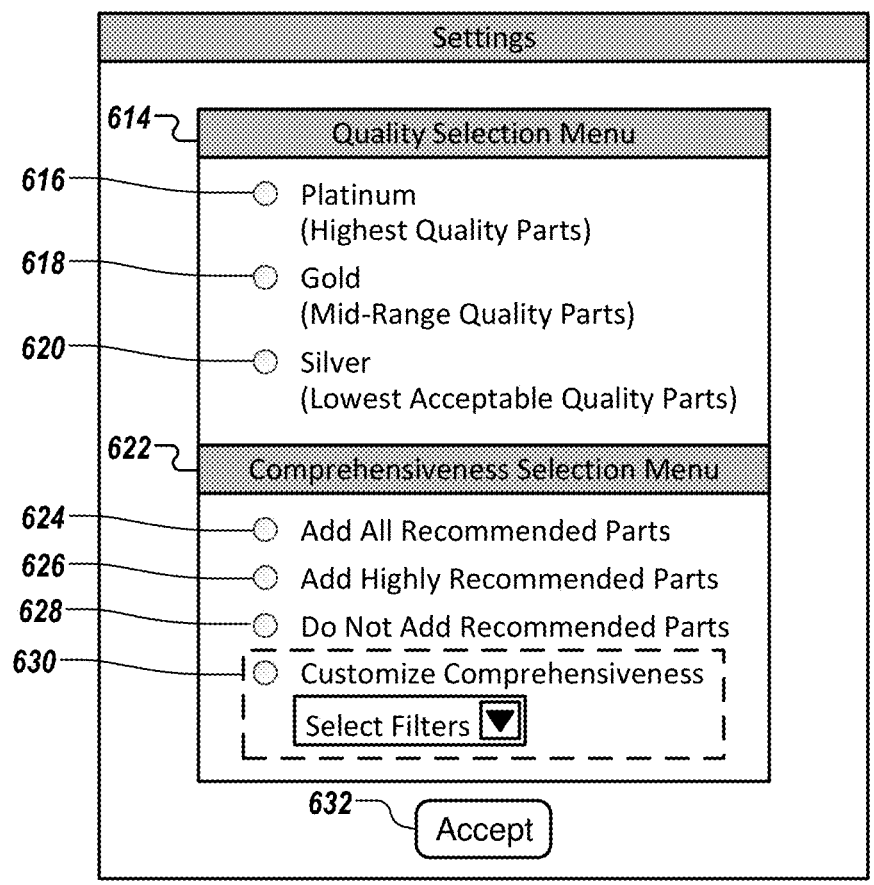

FIG. 6B illustrates some additional example fields that may be included in the health report. Specifically, in addition to overview information, the health report may provide fix information 604, which is generated for presentation by the EBRS host system 102. In some embodiments, the EBRS platform can provide tiered levels of service that offer a pre-selected package of parts for each repair based on the relative quality and/or cost and/or comprehensiveness of the corresponding fix. For instance, a platinum tier offering may pre-select the highest quality parts and include both the parts and tools required to replace required parts, as well as the parts and tools required to repair all recommended parts. In contrast, a silver tier offering pay pre-select the lowest acceptable quality of parts and may not include the parts and tools that are required only for replacement of recommended parts. The gold tier offering may provide mixture of quality and comprehensiveness in-between the platinum and bronze tiers. Accordingly, by selecting the settings icon 606, the user may be provided with another interface such as that shown in FIG. 6C, which presents quality selection menu 614 and comprehensiveness selection menu 622. In the example of quality selection menu 614, the user may pre-select one of three different quality "tiers" to enable quicker identification of parts for purchase. As shown in FIG. 6C, the platinum quality tier (chosen by selection of radio button 616) would correspond to a request for the highest quality part from among any given part type required or recommended for a repair. The gold quality tier (chosen by selection of radio button 618) would correspond to a mid-range quality selection preference, and the silver quality tier (chosen by selection of radio button 620) would correspond to a preference for the lowest acceptable quality level (e.g., to keep expenses down).

Comprehensiveness menu 622 may enable a similar type of selection. The EBRS platform may be used to present both required parts for repair as well as a listing of recommended parts for repair. Comprehensiveness menu 622 allows a user to select which of those recommended parts should be presented by default for purchase. Selection of radio button 624 defaults the system to place all recommended parts into a user's shopping cart. Selection of radio button 624 defaults the system to place all recommended parts into a user's shopping cart. Selection of radio button 626 defaults the system to place only highly-recommended parts into a user's shopping cart (e.g., those parts recommended with a level of urgency greater than some predefined threshold). Selection of radio button 628 defaults the system to place no recommended parts into a user's shopping cart. Finally, selection of radio button 630 enables utilization of a drop-down menu enabling the customization of the comprehensiveness selection plan. In this regard, various possible selections within the drop-down menu may enable more granular comprehensiveness selections based upon the type of part recommended, the cost of the part, or the like.

It will be understood that, in some embodiments, only one of menus 614 and 622 may be presented, and while the precise manner by which the menus gather input may vary (e.g., rather than radio buttons, a slider may be used to indicate quality or comprehensiveness settings), the underlying goal is to predefine preferences that will be applied in the generation of a health report for the user and/or in presentation of fix information to the user for purchase.

Returning to FIG. 6B, the fix information 604 may further include several sub-categories of information. For instance, the fix information 604 may include job complexity information 608, DIY cost information 610, and DIFM cost information 612, all of which may be generated by the EBRS host system 102 based on information harvested and stored in database 106.

The job complexity information may identify an average time to complete the DIY job. This timing information may be predefined based on expert opinions harvested and stored in advance in database 106. Alternatively, this timing information may be gathered from consumer survey responses or from clickstream data illustrating the timing of subsequent activity by users after reviewing the DIY job (e.g., after purchasing parts for a first job, a consumer who searches for a separate job 5 hours later may be estimated to have taken under 5 hours to complete the first job). Similarly, the job complexity information 608 may identify the percentage of consumers who return the parts (roughly illustrating the relative number of consumers who are unable to complete the job). This information may thus be gathered based on statistical analysis of consumer purchasing patterns.

The DIY cost information 610 may be based on the quality and comprehensiveness tiers identified by the user's settings. For instance, a platinum quality tier DIY cost will assume that the user intends to purchase the highest-quality version of each necessary part type or tool, whereas the silver quality tier DIY cost will be based on a lowest-acceptable quality version of each identified part type or tool. Similarly, depending on the comprehensiveness level selected by the user, the DIY cost may vary because a different percentage of recommended parts may be rolled into the DIY cost for the repair. In some embodiments, the absence of quality and comprehensiveness settings by a consumer may result in the EBRS host system 102 predefining a default quality tier selection and/or default comprehensiveness selection, or may leave the DIY cost information blank until the user has advanced to the purchasing interface shown in FIG. 7 and selected the various parts/tools that the user will purchase.

The DIFM cost information 612 may also be based on the quality and comprehensiveness tiers in the same way as the DIY cost information 610. However, DIFM cost information 612 also takes into account labor costs. These labor costs may be calculated by the EBRS host system 102 in several ways. First, the labor costs may be harvested from a third party platform having repair estimates, from a third party platform that crowd-sources repair estimation, or from historical data illustrating past labor costs for a particular repair. Finally, the labor costs may be estimated based on the job complexity information above and the prevailing hourly rate for labor. For instance, given an hourly rate of $100, a five hour complexity estimation might suggest a labor cost estimate of $500 if a mechanic were to perform the repair. In this fashion, DIFM estimates can be based on hard numbers (replacement part purchase price) rather than on arbitrary decision-making.

Figure 7:
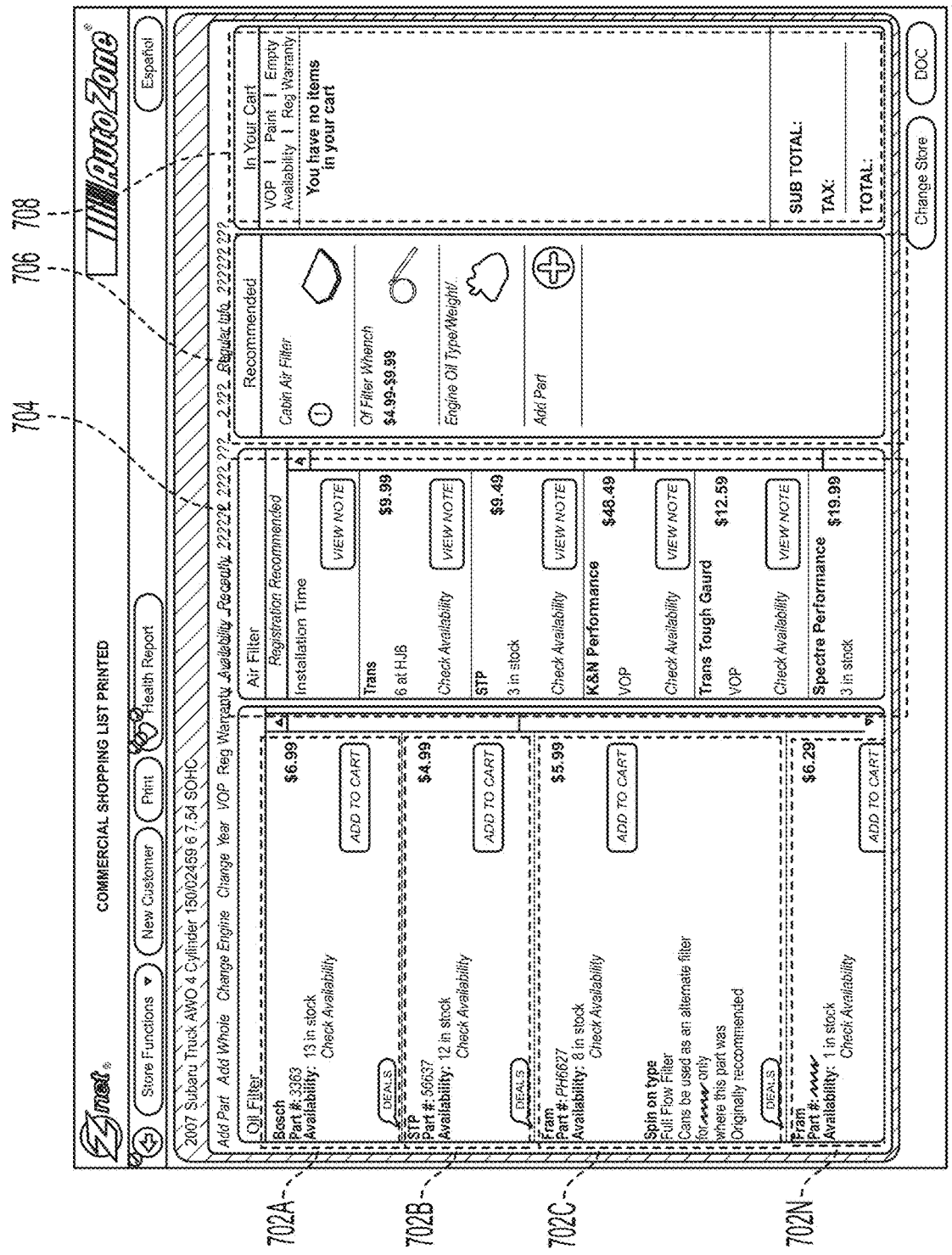
FIG. 7 illustrates a user interface presenting a solution comprising a series of required and optional parts, in accordance with some example embodiments described herein.

Turning next to FIG. 7, an example user interface is shown that presents fix information to the consumer. As shown in FIG. 7, the interface may be split into three primary sections: required part information, which contains items 702A-702N, recommended part information, which is shown in items 704 and 706, and a "shopping cart," as shown in item 708. Turning first to the required part information, the interface shown in FIG. 7 presents a series of possible parts for selection, here labeled 702A, 702B, 702C, and 702N to illustrate that there may be any number of possible parts for selection. Each part may correspond to a part type identified as required in the fix information, and there may be many different parts available corresponding to each part type. Once the user selects any given part, all other parts corresponding to the same part type may be grayed-out or removed from the interface (to prevent the user from purchasing duplicative parts).

It should be noted that various elements of the interactive interface may be flexible and organized for presentation in a number of ways based on a variety of factors. For instance, the ordering of the parts may be designed to present the highest priority parts first, followed by parts having lower priority and so forth. To determine which of the presented parts has the highest priority, the EBRS host system 102 may be designed to evaluate a variety of factors. For instance, the parts may be organized alphabetically or they may be organized by price. Similarly, the parts may be organized according to their inventory levels in various retail locations (e.g., if a consumer is viewing this interface from a retailer device in a store, the parts that are prioritized may be those parts that are available in the store hosting the consumer). Alternatively, however, the prioritization of parts here may be in accordance with vendor-negotiated deals. For instance, if a first vendor negotiates a prioritization deal with the operator of the EBRS host system 102, the presentation of parts may prioritize parts provided by the first vendor over parts provided by other suppliers.

Similarly, vendor relationships may dictate the prioritization of some parts falling within a part type above others. Specifically, vendors may negotiate prioritization deals that emphasize certain products over others, even when both are provided by the same vendors (e.g., a vendor negotiates a prioritization deal that prioritizes a new version of a product over an old version of the product). Finally, the prioritization may be crowd-sourced, such that the parts that are prioritized are those that consumers have most frequently selected for purchase, and this frequency determination may in some embodiments take into account the recency of consumer selections (a first part selected 100 times may be prioritized over a second part selected 50 times, although if 75 selections of the first part had occurred over one year ago while all 50 selections of the second part occurred within the last twelve months, the second part may be prioritized over the first part). Similarly, geography may also be taken into account. For instance, although a first tire may be selected far more frequently in Rochester, New York, a second tire may be selected more frequently in Miami, Florida, and the geographic element may be important in determining the relative merits of the two parts.

Finally, the prioritization of parts may also be informed by historical rates of part returns (e.g., a part that is frequently returned may be ranked lower than a part that is very rarely returned). In arriving at these determinations, the underlying frequency determination may be based on the purchase histories stored by the EBRS host system 102, although it may alternatively be based on clickstream data retrieved during each user's navigation through the interface shown in FIG. 7. For instance, if consumers consistently choose a first part from one vendor over a second part from another vendor (when both fall within the same part type), then the first part may be prioritized or otherwise presented more prominently).

The series of parts shown in item 704 and part types shown in item 706 are those products that are not required, but which are recommended for purchase. For instance, if a required part were an oil filter, a recommended replacement part may be an air filter. The list of recommended parts may be prioritized in similar ways as the list of required parts. One difference, however, is that the most highly recommended part type is assigned to item 704, and the various parts within that part type can then be prioritized in a similar way as the list of required parts. In contrast, the remaining recommended part types are shown in list form in item 706, although the list in item 706 is not broken down into individual parts available for purchase until the part type is selected by the consumer (at which point the selected part type switches places with the part type shown by item 704 and constituent parts within the selected part type are shown).

Finally, in item 708, a shopping cart may be displayed, along with total cost information and a running total cost.

Figure 8B:
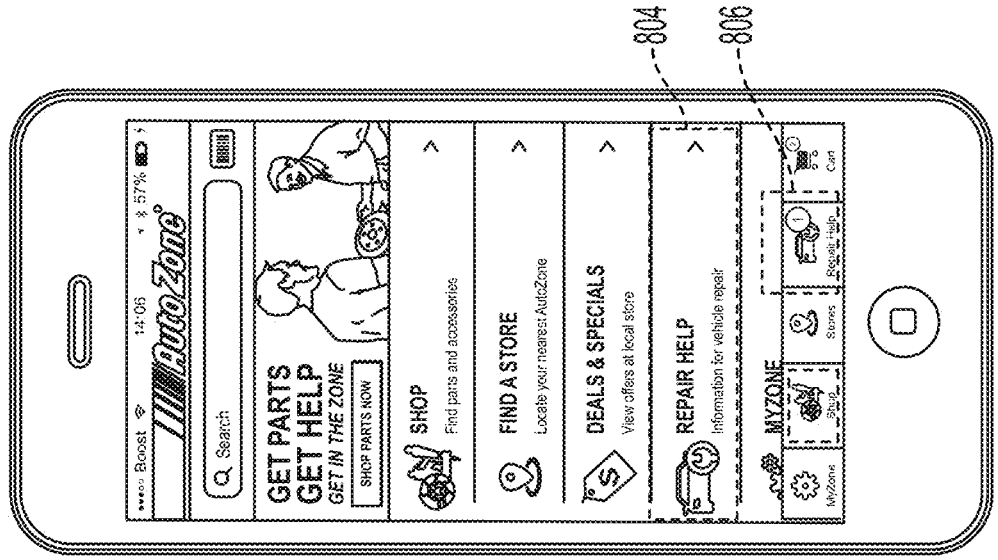
FIGS. 8A and 8B illustrate user interfaces for presentation on a mobile device to identify a problem with a vehicle and activate "fix finder" circuitry designed to develop and present a solution for addressing the problem, in accordance with some example embodiments described herein.
Figure 8A:
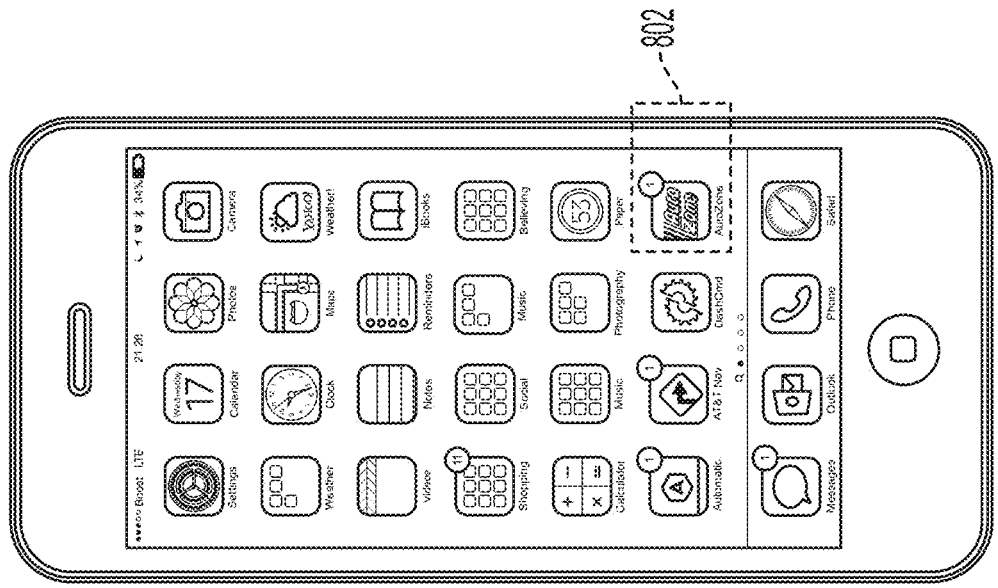
Figure 8E:
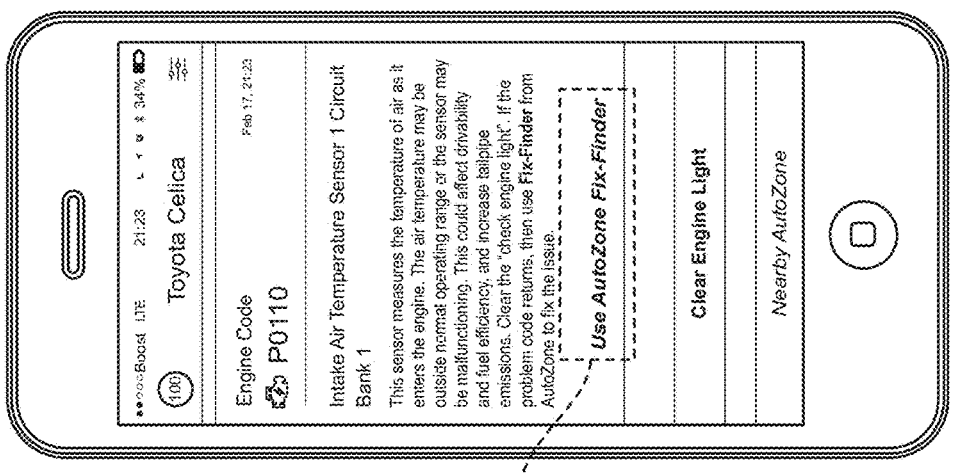
FIGS. 8C, 8D, and 8E illustrate user interfaces for presentation on a mobile device to identify a problem with a vehicle and activate third party "fix finder" circuitry designed to develop and present a solution for addressing the problem, in accordance with some example embodiments described herein.
Figure 8D:
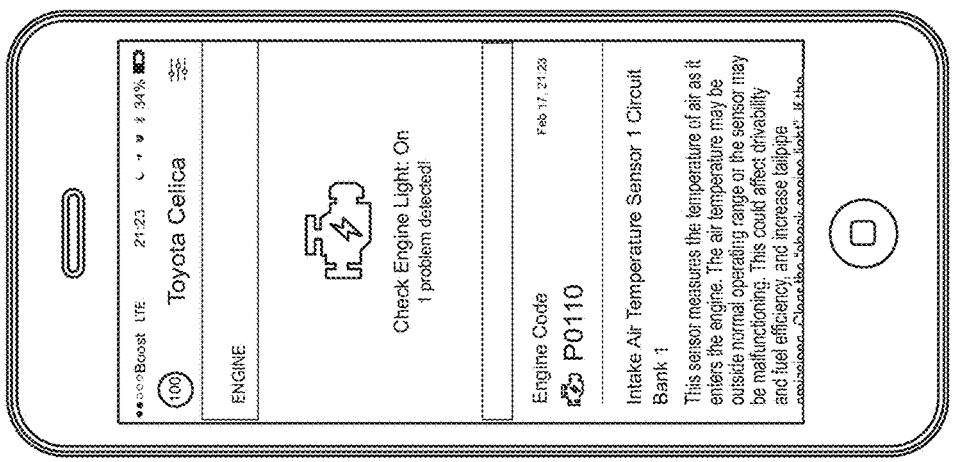
Figure 8C:
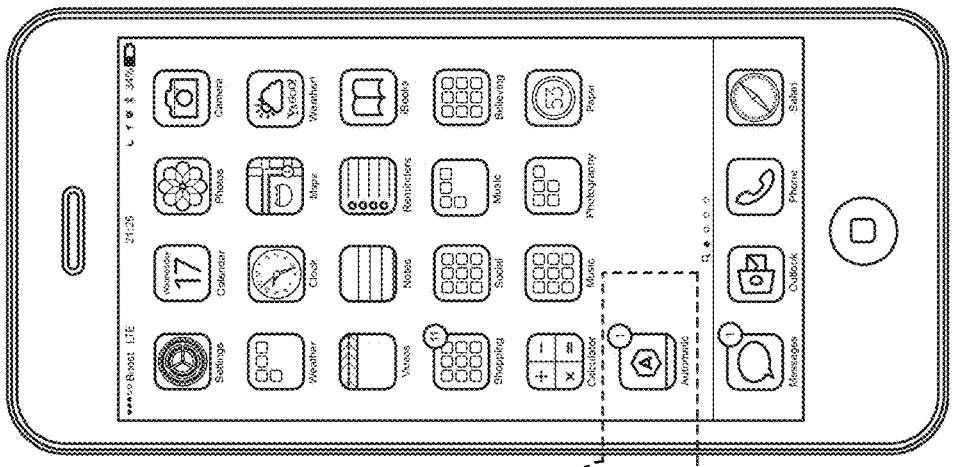

Turning now to FIGS. 8A-8H, mobile implementations of the EBRS platform are described. As shown in FIG. 8A, when the Check Engine Light (CEL) of a vehicle is detected, that fact may trigger an icon notification 802 to appear on the icon for a mobile app provided by the EBRS host system 102 to a retailer device 110 or third party device 112. Upon selection thereafter, FIG. 8B illustrates a landing page for the mobile app, which illustrates a similar icon notification over the "Repair Help" icon 806 within the mobile app itself. Upon selection of the "Repair Help" icon 806 or the "Repair Help" menu icon 804, the user will be shown an interface such as that provided in FIG. 8F, described below. In another implementation, however, a third party mobile app may be modified to add "fix finder" functionality. In this regard, as shown in FIG. 8C, an icon for the third party mobile app icon may include a trigger notification of this check engine light. Upon selection of the third party app, the third party app may provide its traditional functionality (as shown in FIG. 8D), but will also present a menu option to select a "Fix Finder," as provided by the EBRS host system 102 (as shown in FIG. 8E).

Figure 8H:
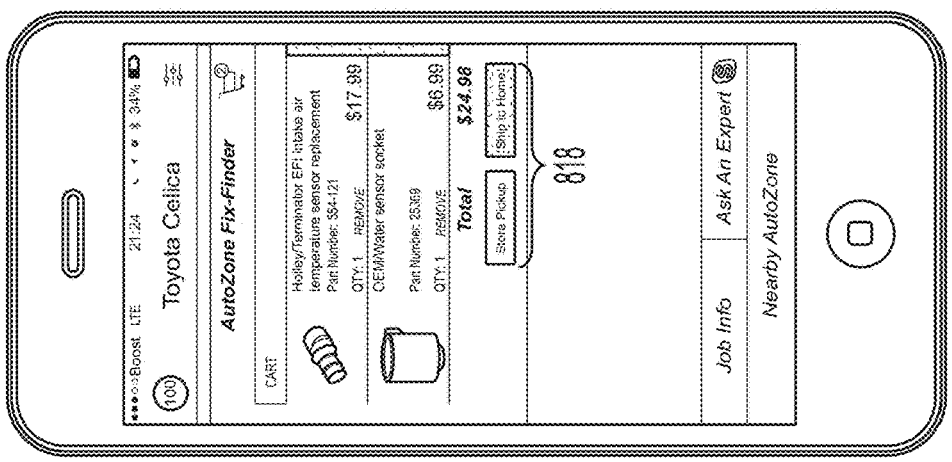
FIGS. 8F, 8G, and 8H illustrate user interfaces for presentation on a mobile device to identify part types for replacement, select parts within the identified part types, and purchase the selected parts, in accordance with some example embodiments described herein.
Figure 8G:
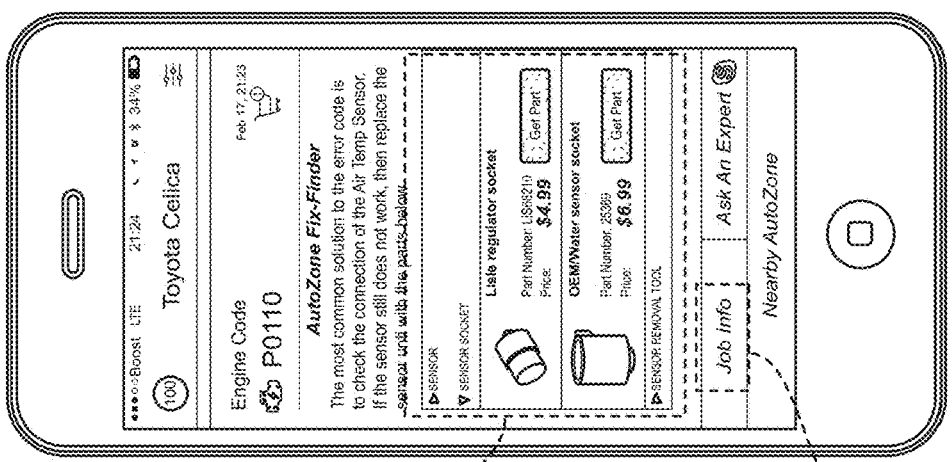
Figure 8F:
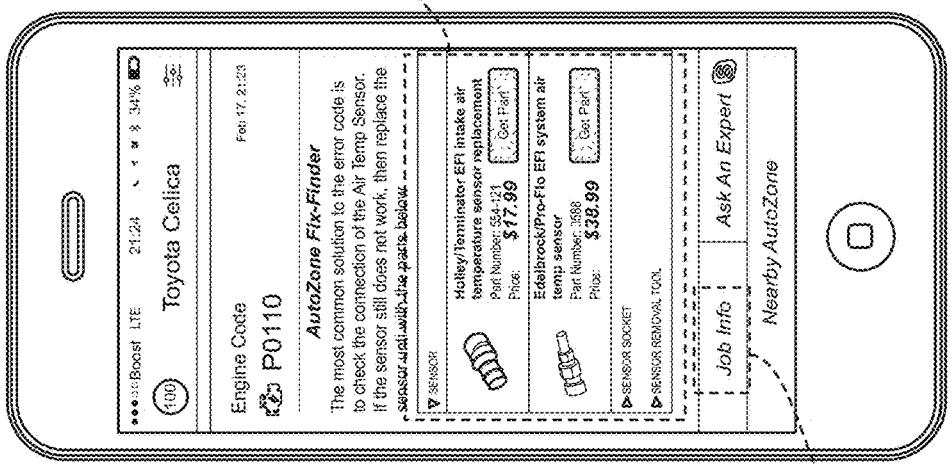

Once the "Repair Help" or "Fix Finder" icons are selected, the user may be presented with an interface such as that shown in FIG. 8F. This interface may present dropdown lists for each of a series of part types needed to address the CEL. Parts to complete the job associated with the CEL can be displayed upon selection of each part type (as shown in in items 812 of FIG. 8F and 816 in FIG. 8G). Moreover, selection of the "Job Info" icon shown in FIGS. 8F and 8G may prompt display of an interface corresponding to the health report described previously in connection with FIGS. 6A and 6B. Finally, as shown in FIG. 8H, a shopping cart associated with part selections can presented, enabling the user to order the set of parts from the mobile terminal. In some embodiments, this feature enables users to buy parts for shipment to the user's location or for pickup in store, without having to leave the mobile app.

Having provided an overview of various graphical interfaces that may be utilized by the EBRS platform, specific operations performed by various parties contemplated herein are disclosed below.

Operations Performed by the EBRS Host System

Figure 9:
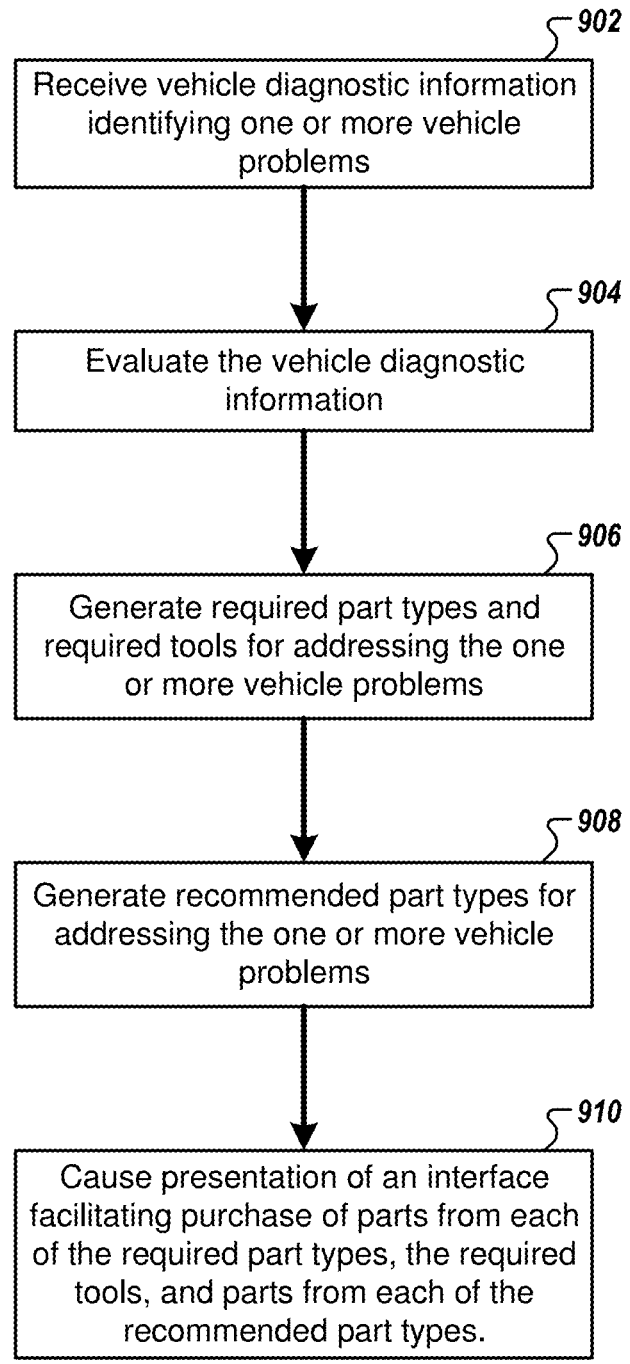
FIGS. 9 and 10 illustrates flowcharts describing example operations performed by the EBRS host system, in accordance with some example embodiments described herein.
Figure 10:
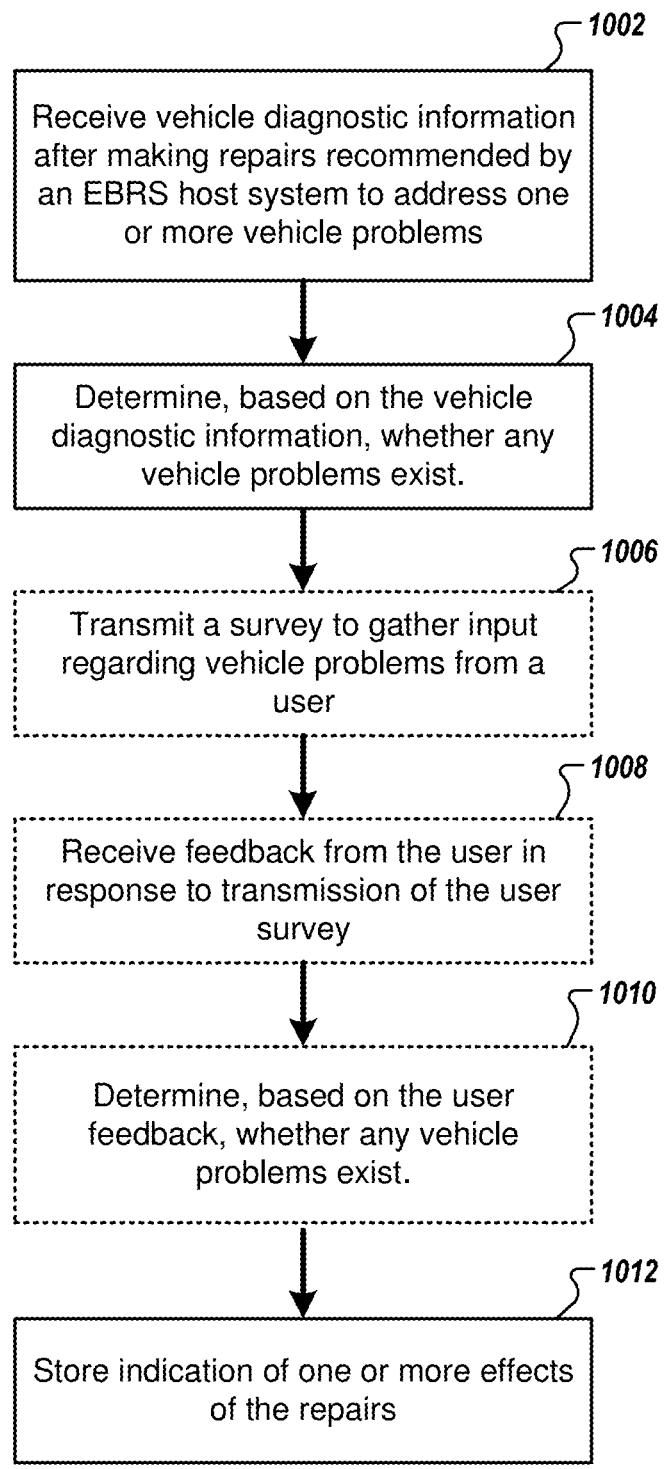

FIGS. 9 and 10 illustrate a series of flowcharts that contain operations performed by an EBRS host system 102 for facilitating a DIY EBRS solution. The operations illustrated in FIGS. 9 and 10 may, for example, be performed by, with the assistance of, and/or under the control of an apparatus 200 embodying an EBRS host system 102 or a server 104 that is a part of the EBRS host system 102, and more particularly through the use of one or more of processor 202, memory 204, input/output circuitry 206, communications circuitry 208, diagnostic circuitry 210, and fix finder circuitry 212.

Turning first to FIG. 9, a series of operations are illustrated using which the EBRS host system 102 may generate and present recommendations based on vehicle diagnostic information. In operation 902 the apparatus 200 includes means, such as input/output circuitry 206, communications circuitry 208, or the like, for receiving, by an experience-based repair service (EBRS) host system, vehicle diagnostic information identifying one or more vehicle problems.

In operation 904 the apparatus 200 includes means, such as processor 202, memory 204, diagnostic circuitry 210, or the like, for evaluating, by the EBRS host system, the vehicle diagnostic information. Based on the received vehicle diagnostic information, the diagnostic circuitry 210 is configured to identify the underlying problem (e.g., low fluid level, broken tail light, loss of power steering, etc.). In many embodiments, identification of the problem is performed primarily by using OBD-II diagnostic codes to identify faulty part types. In some embodiments, the vehicle diagnostic information does not merely comprise OBD-II diagnostic codes, but further includes additional vehicle information that can be used separately or in conjunction with vehicle diagnostic codes to identify the underlying issue. For instance, this vehicle diagnostic information may include vehicle telematics information retrieved from a vehicle telematics system, symptoms provided by the customer, and/or historical information regarding repairs of similar vehicles that the diagnostic circuitry 210 may use to independently confirm the faulty part types. Similarly, the diagnostic circuitry 210 may perform root cause analysis of the failure of the faulty part types identified by the diagnostic codes, and may utilize historical information from database 106, in additional to location information, and/or seasonal information that may be independently derivable.

In operation 906 the apparatus 200 includes means, such as processor 202, fix finder circuitry 212, or the like, for generating, by the EBRS host system and based on the evaluation of the vehicle diagnostic information, required part types and required tools for addressing the one or more vehicle problems. As noted previously, the generation of required part types and required tools may utilize a memory 202 (e.g., storing database 106 of the EBRS host system 102) that provides curated fix information that identifies the required parts and tools.

In operation 908 the apparatus 200 includes means, such as processor 202, fix finder circuitry 212, or the like, for generating, by the EBRS host system and based on the evaluation of the vehicle diagnostic information, recommended part types for addressing the one or more vehicle problems. As noted previously, the generation of recommended part types may utilize a memory 202 (e.g., storing database 106 of the EBRS host system 102) that provides curated fix information that can be referenced to identify not only the required parts and tools, but additional parts that may be useful to replace assuming that the required parts are being replaced. For instance, if access to one part also provides easy access to another part that is not broken, it still may be worth replacing both parts at that time.

In operation 910 the apparatus 200 includes means, such as input/output circuitry 206, communications circuitry 208, or the like, for causing presentation of an interface facilitating purchase of required parts from each of the generated required part types, the required tools, and recommended parts from each of the generated recommended part types. In some embodiments, the retailer may offer a "loaner tool" program providing a consumer with access needed tools without the requirement to purchase those tools outright. In such embodiments, the interface facilitating purchase of the required parts may offer the options to purchase or to rent any relevant loaner tool. Moreover, in some embodiments, the interface may also present an offer of a bulk discount if the consumer purchase all required parts as well as all recommended parts. In some embodiments, the apparatus 200 may further include means, such as processor 202, fix finder circuitry 212, or the like, for generating complexity information relating to each of the one or more vehicle problems, wherein the complexity information identifies an estimated time period needed to complete repair of each of the one or more vehicle problems. In such embodiments, the interface facilitating purchase may further include the generated complexity information. It should be understood that generating complexity information may be done in a number of ways.

In some example embodiments, generating complexity information relating to a vehicle problem includes retrieving, by the EBRS host system, historical information regarding frequency of returns of parts and tools associated with the vehicle problem, and assigning a level of complexity to the vehicle problem based on the frequency of returns.

In other embodiments, generating the complexity information includes calculating an estimated time to fix the vehicle problem. This estimated time to fix the vehicle problem, in turn, may be performed by the apparatus 200 by retrieving historical information regarding time periods until subsequent activity by consumers having purchased parts relating to the vehicle problem, and averaging the time periods until the subsequent activity, wherein the estimated time to fix the vehicle problem is based on the averaging of the time periods until the subsequent activity. This historical information may in some embodiments include vehicle diagnostic information retrieved from vehicles that identifies when the vehicle problems are fixed. Alternatively, calculating the estimated time to fix the vehicle problem may include causing dissemination of customer surveys corresponding to vehicle problems after each purchase, wherein the customer surveys request information regarding the estimated time to fix the vehicle problem, and receiving, by the EBRS host system, consumer responses to the customer surveys, wherein the estimated time to fix the vehicle problem is based on the received consumer responses.

Another aspect of the interface facilitating purchase of required parts, the required tools, and recommended parts is that the presentation can be tailored to the particular desires of a given consumer. As one example, the apparatus 200 may further includes means, such as input/output circuitry 206, communications circuitry 208, or the like, for causing presentation of an interface facilitating selection from a plurality of quality tiers, and receiving selection of a quality tier from the plurality of quality tiers. Prioritization of the required parts from each of the generated required part types and the recommended parts from each of the generated recommended part types may then be based on the selected quality tier. As another example, the apparatus 200 may further includes means, such as input/output circuitry 206, communications circuitry 208, or the like, for causing presentation of an interface facilitating selection from a plurality of comprehensiveness tiers, and receiving, by the EBRS host system, selection of a comprehensiveness tier from the plurality of comprehensiveness tiers. The recommended part types can then be generated based on the selected comprehensiveness tier.

It should be understood that the EBRS platform can be implemented by software operated by the EBRS host system 102, or can be implemented via an API from third party applications. In such embodiments, the apparatus 200 may cause the presentation of the interface facilitating purchase of the required parts, the required tools, and the recommended parts in response to receiving an API call from a third party application.

Another element of the interface facilitating purchase of required parts, the required tools, and recommended parts is that the presentation of individual parts falling within any given part type can be tailored in a number of ways. For instance, the apparatus 200 may further includes means, such as processor 202, fix finder circuitry 212, or the like, for identifying orders of priority of the required parts and the recommended parts, wherein causing presentation of the interface facilitating purchase of the required parts, the required tools, and the recommended parts includes causing presentation of the required parts and the recommended parts in the corresponding orders of priority. In such embodiments, the order of priority of the required parts and the recommended parts are based on one or more of: price, inventory levels, vendor-negotiated deals, geography, or historical rates of part returns, as described previously.

Turning next to FIG. 10, a series of operations are illustrated using which the EBRS host system 102 may determine the effectiveness of suggested repairs. In operation 1002, the apparatus 200 includes means, such as input/output circuitry 206, communications circuitry 208, or the like, for receiving, by the EBRS host system, vehicle diagnostic information after making repairs recommended by the EBRS host system to address one or more vehicle problems.

In operation 1004, the apparatus 200 includes means, such as processor 202, memory 204, diagnostic circuitry 210, or the like, for determining, by the EBRS host system and based on the vehicle diagnostic information, whether any vehicle problems exist and/or what problems exist. This operation may in some embodiments be similar to operation 904, described previously. For instance, the diagnostic circuitry 210 may be configured to determine, based on the received vehicle diagnostic information, whether any vehicle problems exist, and identify, if any problem is detected, the underlying problem (e.g., low fluid level, broken tail light, loss of power steering, etc.). In many embodiments, identification of the problem is performed primarily by using OBD-II diagnostic codes to identify faulty part types. In some embodiments, however, the vehicle diagnostic information supplements the OBD-II diagnostic codes with additional vehicle diagnostic information that can be used to separately identify the underlying issue or to refine the identification of the underlying issue. For instance, the vehicle diagnostic information may include information retrieved from a vehicle telematics system, symptoms provided by the customer, and/or historical information regarding repairs of similar vehicles that the diagnostic circuitry 210 may use to independently confirm the faulty part types. Similarly, the diagnostic circuitry 210 may perform root cause analysis of the failure of the faulty part types identified by the diagnostic codes, and may utilize historical information from database 106, in additional to location information, and/or seasonal information that may be independently derivable. From operation 1004, the procedure may advance to optional operations 1006, 1008, and 1010 in embodiments utilizing a survey, or may instead advance directly to operation 1012 for processing of the vehicle problems that have been identified in operation 1004 alone.

To perform optional operation 1006, the apparatus 200 may include means, such as input/output circuitry 206, communications circuitry 208, or the like, for transmitting, by the EBRS host system, a survey to gather input regarding vehicle problems from a user. The survey may provide a separate path for discovery of problems and/or more granular detail regarding solutions to the problems previously identified by the EBRS system. The survey may be presented as an interface allowing the user providing various feedback information. In some embodiments, the survey may ask the user if all previously identified problems have been addressed by the repairs recommended by the EBRS host system, and/or allow the user to identify new problems that may have been caused by making the repairs. Moreover, in some embodiments, the survey may provide an interface for the user to provide a granular indication regarding each problem that was supposed to be fixed, as well as each new problem that may have been caused by making the repairs. In this regard, the survey may request that the user indicate, in an instance in which a problem has been fixed, whether the problem was fixed by the repair recommended by the EBRS host system, how the problem was fixed if it was not fixed by the repair recommended by the EBRS host system, or if the problem has not been fixed at all.

To perform optional operation 1008, which may be performed in response to the transmission of a survey in optional operation 1006, the apparatus 200 includes means, such as input/output circuitry 206, communications circuitry 208, or the like, for receiving, by the EBRS host system, feedback from the user in response to transmission of the user survey.

From operation 1008, the procedure may advance to optional operation 1010, in which the apparatus 200 includes means, such as processor 202, memory 204, diagnostic circuitry 210, or the like, for determining, by the EBRS host system and based on the user feedback, whether any vehicle problems exist and/or what problems exist. Accordingly, in addition to identifying problems based on the vehicle diagnostic information described in operation 1004, the procedure illustrated in FIG. 10 may optionally also utilize the feedback from the user via the steps described in operations 1006, 1008, and 1010. It should be understood that operations 1006, 1008, and 1010 may be performed even if operations 1002 and 1004 are performed, and in such embodiments, a survey will provide the sole mechanism for evaluating the effects of the repairs, a second interrogation of a vehicle OBD-II port need not be performed.

Finally, from either of operations 1004 or 1010 above, the procedure may advance to operation 1012, in which the apparatus 200 includes means, such as processor 202, memory 204, diagnostic circuitry 210, or the like, for storing, by the EBRS host system, an indication of one or more effects of the repairs. To facilitate performance of this storage operation, the apparatus 200 may include means, such as processor 202, memory 204, diagnostic circuitry 210, or the like, for generating an indication of the one or more effects of the repairs based on the determinations of whether vehicle problems exist provided from either or both of operations 1004 and 1010. Generating the one or more effects of the vehicle repair may include comparing the set of problems identified previously by the EBRS host system to the set of vehicle problems identified after completion of the repair. Moreover, the one or more effects of the vehicle repair may further utilize the more granular information contained in the feedback from the user in operation 1008 to pinpoint which previously identified vehicle problems were addressed by repairs recommended by the EBRS host system, and if multiple problems were fully addressed, which vehicle problem was address by which repair. The effects of the repairs may further provide an indication of whether the repairs appear to have introduced any new problems. By storing the effects of the repairs, future repair recommendations can be modified to maximize the effectiveness of the repair suggestions provided by the EBRS host system.

Operations Performed by a Retailer Device or a Third Party Device

Figure 11:
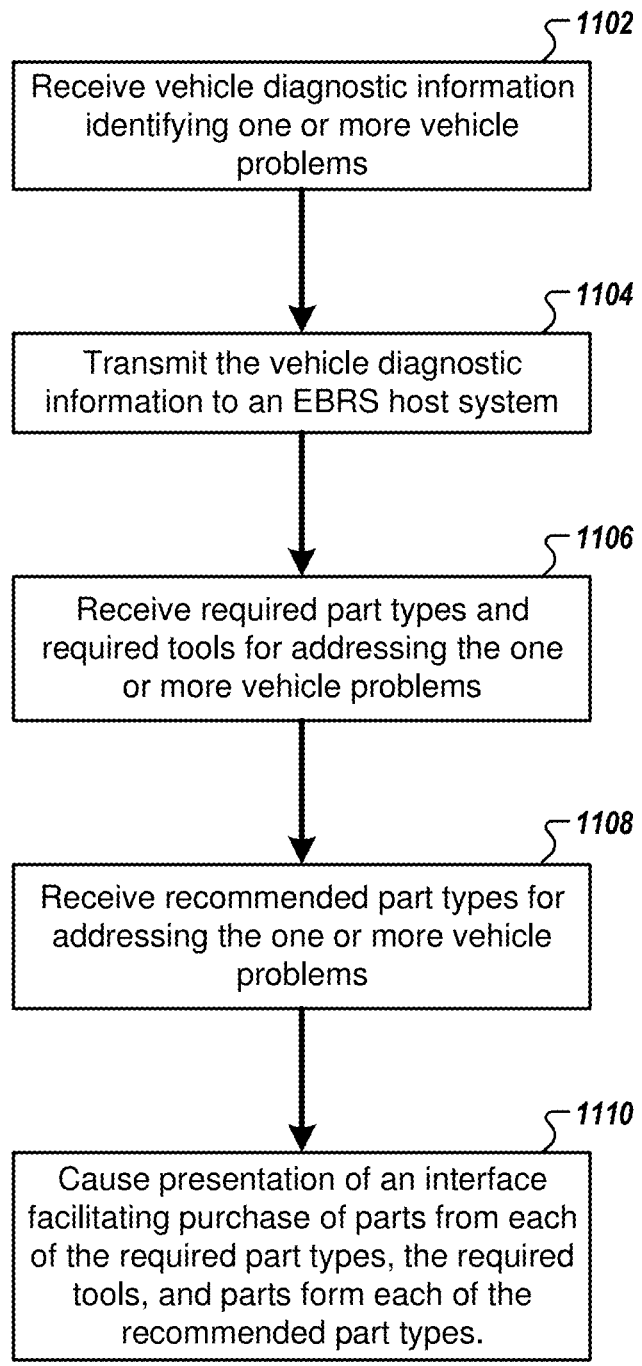
FIGS. 11 and 12 illustrate flowcharts describing example operations performed by a retailer device or a third party device, in accordance with some example embodiments described herein.
Figure 12:
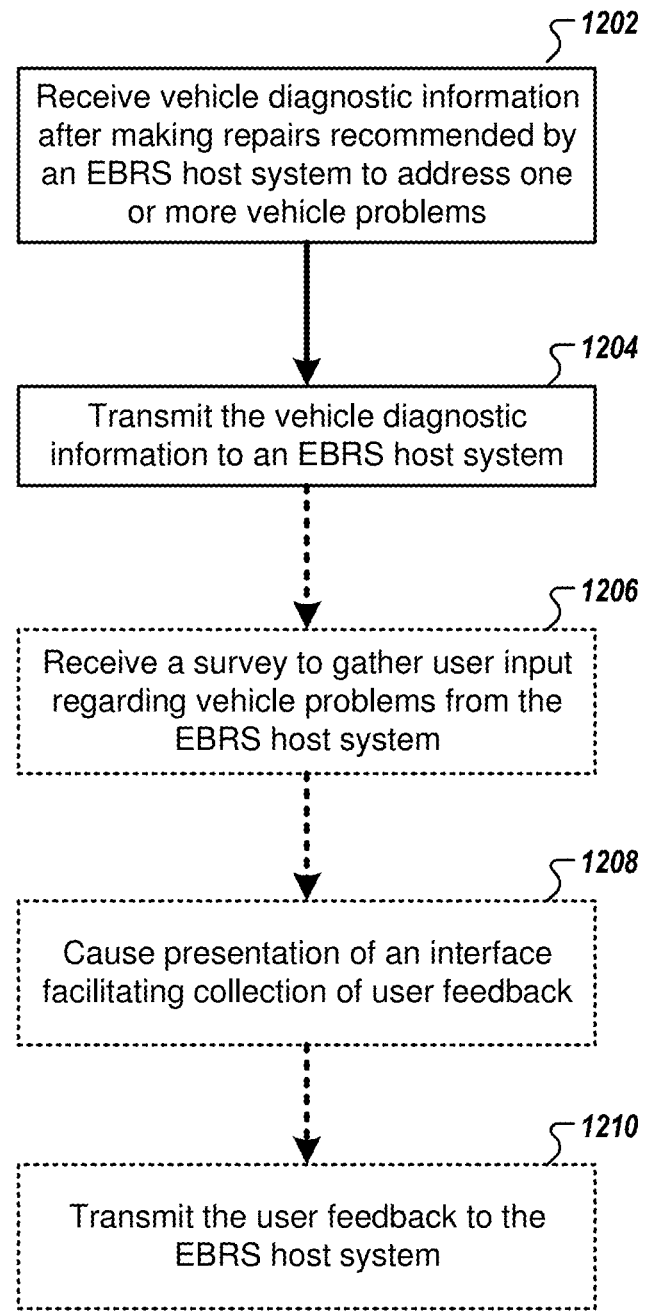

Turning now to FIGS. 11 and 12, flowcharts are illustrated that contains a series of operations performed by a retailer device 110 or by a third party device 112. In embodiments where the operations illustrated in FIGS. 11 and 12 are performed by a retailer device 110, the operations may, for example, be performed by, with the assistance of, and/or under the control of apparatus 300 embodying a third party device 110, and more particularly through the use of one or more of processor 302, memory 304, input/output circuitry 306, communications circuitry 308, or OBD-II scanning circuitry 310. It will be understood that the operations illustrated in FIGS. 11 and 12 can also be performed by a third party device 112, in which case the operations may, for example, be performed by, with the assistance of, and/or under the control of corresponding features of the apparatus 400.

Turning to FIG. 11, a series of operations are illustrated using which a retailer device 110 or third party device 112 may retrieve repair recommendations and facilitate purchase of corresponding parts. In operation 1102, the apparatus 300 includes means, such as memory 304, input/output circuitry 306, communications circuitry 308, OBD-II scanning circuitry 310, or the like, for receiving vehicle diagnostic information identifying one or more vehicle problems. In some embodiments, this operation may include receiving, via communications circuitry, diagnostic trouble codes from an external OBD-II scanner. In some embodiments, this external OBD-II scanner may comprise a loaner device provided by the retailer that a consumer or retailer agent can use to interrogate the consumer's vehicle. In other embodiments, this may include receiving the diagnostic trouble codes directly from a vehicle via OBD-II scanning circuitry 310. Finally, this operation may include receiving user input (e.g., via input/output circuitry 306) or receiving the vehicle diagnostic information from a historical database stored by memory 304 (or retrieved, via communications circuitry 308, from an external memory such as database 106.)

In operation 1104, the apparatus 300 includes means, such as communications circuitry 308 or the like, for transmitting the received vehicle diagnostic information to an EBRS host system.

In operation 1106, the apparatus 300 includes means, such as communications circuitry 308 or the like, for receiving, from the EBRS host system, required part types and required tools for addressing the one or more vehicle problems.

In operation 1108, the apparatus 300 includes means, such as communications circuitry 308 or the like, for receiving, from the EBRS host system, recommended part types for addressing the one or more vehicle problems.

In operation 1110 the apparatus 300 includes means, such as processor 302, communications circuitry 308, or the like, for causing presentation of an interface facilitating purchase of required parts from each of the generated required part types, the required tools, and recommended parts from each of the generated recommended part types. It should be understood that the operation 1110 may further include means, such as communications circuitry 308, or the like, for receiving, from the EBRS host system, complexity information relating to each of the one or more vehicle problems, wherein the complexity information identifies an estimated time period needed to complete repair of each of the one or more vehicle problems; and means, such as processor 302, communications circuitry 308, or the like, for causing presentation of the generated complexity information. In such embodiments, the complexity information relating to a vehicle problem may include a level of complexity to the vehicle problem based on the frequency of returns. Additionally or alternatively, the complexity information relating to a vehicle problem includes an estimated time to fix the vehicle problem. This estimated time to fix the vehicle problem, in turn, may be calculated by the apparatus 300 by retrieving historical information regarding time periods until subsequent activity by consumers having purchased parts relating to the vehicle problem, and averaging the time periods until the subsequent activity, wherein the estimated time to fix the vehicle problem is based on the averaging of the time periods until the subsequent activity. This historical information may include vehicle diagnostic information retrieved from vehicles that identifies when the vehicle problems are fixed. Alternatively, calculating the estimated time to fix the vehicle problem may include causing dissemination of customer surveys corresponding to vehicle problems after each purchase, wherein the customer surveys request information regarding the estimated time to fix the vehicle problem, and receiving, by the EBRS host system, consumer responses to the customer surveys, wherein the estimated time to fix the vehicle problem is based on the received consumer responses.

In some embodiments, operation 1110 may further include means, such as input/output circuitry 306, communications circuitry 308, or the like, for causing presentation of an interface facilitating selection from a plurality of quality tiers, receiving selection of a quality tier from the plurality of quality tiers, and transmitting the selected quality tier to the EBRS host system. Similarly, in some embodiments, operation 1110 may further include means, such as input/output circuitry 306, communications circuitry 308, or the like, for causing presentation of an interface facilitating selection from a plurality of comprehensiveness tiers, receiving selection of a comprehensiveness tier from the plurality of comprehensiveness tiers, and transmitting the selected comprehensiveness tier to the EBRS host system.

Turning to FIG. 12, a series of operations are illustrated using which a retailer device 110 or third party device 112 may facilitate the determination of the effectiveness of suggested repairs. In operation 1202, the apparatus 300 includes means, such as memory 304, input/output circuitry 306, communications circuitry 308, OBD-II scanning circuitry 310, or the like, for receiving vehicle diagnostic information after making repairs recommended by an EBRS host system to address one or more vehicle problems. In some embodiments, this operation may include receiving, via communications circuitry, diagnostic trouble codes from an external OBD-II scanner. In some embodiments, this external OBD-II scanner may comprise a loaner device provided by the retailer that a consumer or retailer agent can use to interrogate the consumer's vehicle. In other embodiments, this may include receiving the diagnostic trouble codes directly from a vehicle via OBD-II scanning circuitry 310. Finally, this operation may include receiving user input (e.g., via input/output circuitry 306) or receiving the vehicle diagnostic information from a historical database stored by memory 304 (or retrieved, via communications circuitry 308, from an external memory such as database 106).

In operation 1204, the apparatus 300 includes means, such as communications circuitry 308 or the like, for transmitting the received vehicle diagnostic information to an EBRS host system.

In optional operation 1206, the apparatus 300 may include means, such as communications circuitry 308 or the like, for receiving, from the EBRS host system, a survey to gather user input regarding vehicle problems.

In response to operation 1206, the procedure may advance to optional operation 1208, in which the apparatus 300 includes means, such as processor 302, communications circuitry 308, or the like, for causing presentation of an interface facilitating collection of user feedback regarding vehicle problems. The user feedback to be collected may include information such as if all vehicle problems are addressed by the repairs recommended by the EBRS host system, if new problems may have been caused by making the repairs, if each problem has been fixed by the repair recommended by the EBRS host system, and/or how the problem is fixed if it is not fixed by the repair recommended by the EBRS host system.

In operation 1210, the apparatus 300 includes means, such as input/output circuitry 306, communications circuitry 308, or the like, for transmitting the user feedback to the EBRS host system. It should be understood that operations 1206, 1208, and 1210 are designated as optional because some embodiments of the procedure described in FIG. 12 may not involve a survey and may instead rely purely on updated vehicle diagnostic information that may be gathered in accordance with operation 1202 above. However, it should be understood that operations 1206, 1208, and 1210 may be performed even if operations 1202 and 1204 are not, and in such embodiments, a survey will provide the sole mechanism facilitating the determination of the effects of the repairs, and a second interrogation of is not performed.

As described above, example embodiments disclosed herein provide an EBRS platform for facilitating Do-It-Yourself (DIY) repairs. The EBRS platform provides consumers with the information necessary to evaluate the costs and requirements of repairing damage to vehicles and to facilitate a DIY EBRS solution. Moreover, example embodiments enable consumers to evaluate the complexity of the repair and evaluate the merits of making additional recommended repairs at the same time. Furthermore, by facilitating the purchase of the necessary and recommended parts and tools, the EBRS platform enables one-stop shopping without the hassle of multiple rounds of purchasing based on the discovery, during repair, of newly required parts or tools. Finally, by collecting the closed-loop feedback information, the EBRS platform can continually update the vehicle problems and appropriate repairs, which enables continual improvement the service and recommendations provided to consumers in the future.

FIGS. 9-12 illustrate flowcharts describing the operation of apparatuses, methods, and computer program products according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware and computer instructions.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for generating an interactive vehicle-diagnostic and repair interface for a target vehicle having an onboard computer configured for generating diagnostic information, the method comprising:
   receiving, by an experience-based repair service (EBRS) host system, target vehicle diagnostic information reflecting data generated by the onboard computer of the target vehicle;
   evaluating, by the EBRS host system, the target vehicle diagnostic information at least in part by querying one or more databases storing fix information associated with vehicle diagnostic information;
   retrieving, by the EBRS host system and based at least in part on the evaluation of the target vehicle diagnostic information, fix information stored at the one or more databases and identifying recommended part types associated with the target vehicle diagnostic information;
   providing, by the EBRS host system, at least a portion of complexity information relating to at least a portion of the target vehicle diagnostic information and comprising a level of complexity and an estimated repair time associated with the at least a portion of the target vehicle diagnostic information, wherein the complexity information is generated at least in part by:
      retrieving historical information regarding frequency of returns of the recommended part types associated with the target vehicle diagnostic information, wherein the historical information regarding frequency of returns is generated at least in part by one or more retail computing devices and the EBRS host system and the historical information regarding frequency of returns is based at least in part on aggregate information regarding part returns at a plurality of locations each associated with a corresponding retail computing device of a plurality of retail computing devices;
   assigning a level of complexity to the at least a portion of the target vehicle diagnostic information, wherein the level of complexity at least partially reflects the data regarding the frequency of returns;
   retrieving clickstream data reflecting access by user computing devices of repair-related information provided by the EBRS host system and reflecting timing of subsequent activity between the user computing devices and the EBRS host system, wherein the clickstream data is stored in the one or more databases as data reflecting interactions between user computing devices and the EBRS host system; and
   generating aggregate timing data based at least in part on the clickstream data, wherein the aggregate timing data reflects an estimated repair time associated with the at least a portion of the target vehicle diagnostic data; and
   transmitting an interface comprising the complexity information, the vehicle diagnostic information, and the fix information, to a third party computing device.

2. The method of claim 1, further comprising retrieving, by the EBRS host system and based on the evaluation of the vehicle diagnostic information, fix information identifying required part types and required tools associated with the target vehicle diagnostic information.

3. The method of claim 2, wherein the interface transmitted to the third party computing device additionally facilitates execution of a purchase between the third party computing device and the EBRS host system of at least one of: (a) required parts from each of the required part types and the required tools, or (b) recommended parts from each of the recommended part types.

4. The method of claim 1, wherein the target vehicle diagnostic information reflects data generated by the onboard computer of the target vehicle and retrieved from the onboard computer of the target vehicle by a vehicle diagnostic code reader.

5. The method of claim 1, wherein the target vehicle diagnostic information identifies one or more vehicle problems of the target vehicle.

6. The method of claim 1, further comprising:
   causing presentation of an interface facilitating selection from a plurality of quality tiers;
   receiving, by the EBRS host system, selection of a quality tier from the plurality of quality tiers, and
   prioritizing recommended parts from each of the recommended part types based at least in part on the selected quality tier.

7. The method of claim 1, further comprising:
   causing presentation of an interface facilitating selection from a plurality of comprehensiveness tiers; and
   receiving, by the EBRS host system, selection of a comprehensiveness tier from the plurality of comprehensiveness tiers,
   wherein the recommended part types are generated based at least in part on the selected comprehensiveness tier.

8. The method of claim 1, wherein the EBRS host system causes presentation of an interface facilitating purchase of recommended parts in response to an application programming interface (API) call from a third party application.

9. The method of claim 8, further comprising:
identifying an order of priority of recommended parts,
wherein causing presentation of the interface facilitating purchase of recommended parts includes causing presentation of recommended parts in the order of priority.

10. The method of claim 9, wherein the order of priority of recommended parts is based on one or more of: price, inventory levels, vendor-negotiated deals, geography, or historical rates of part returns.

11. The method of claim 1, further comprising:
receiving, by the EBRS host system and after causing presentation of an interface facilitating purchase of recommended parts, additional target vehicle diagnostic information;
determining, by the EBRS host system and based on the additional target vehicle diagnostic information, whether any vehicle problems exist; and
storing, by the EBRS host system, an indication of one or more effects of repairs involving purchased recommended parts.

12. The method of claim 1, further comprising:
transmitting, by the EBRS host system, a survey to gather input regarding vehicle problems from a user computing entity reflecting user input;
receiving, by the EBRS host system, feedback data generated at a user computing device based at least in part on user input provided in response to transmission of the survey;
determining, by the EBRS host system and based on the feedback data, whether any vehicle problems exist; and
storing, by the EBRS host system, an indication of one or more effects of repairs involving purchased recommended parts.

13. An apparatus for generating an interactive vehicle-diagnostic and repair interface for a vehicle having an onboard computer configured for generating diagnostic information, the apparatus comprising at least one processor and at least one memory storing computer-executable instructions, that, when executed by the at least one processor, cause the apparatus to:
receive, by an experience-based repair service (EBRS) host system, target vehicle diagnostic information reflecting data generated by the onboard computer of a target vehicle;
evaluate the target vehicle diagnostic information at least in part by querying one or more databases storing fix information associated with vehicle diagnostic information;
retrieve, based at least in part on the evaluation of the target vehicle diagnostic information, fix information stored at the one or more databases and identifying recommended part types associated with the target vehicle diagnostic information;
providing at least a portion of complexity information relating to at least a portion of the target vehicle diagnostic information and comprising a level of complexity and an estimated repair time associated with the at least a portion of the target vehicle diagnostic information, wherein the complexity information is generated at least in part by:
retrieving historical information regarding frequency of returns of the recommended part types associated with the target vehicle diagnostic information, wherein the historical information regarding frequency of returns is generated at least in part by one or more retail computing devices and the EBRS host system and the historical information regarding frequency of returns is based at least in part on aggregate information regarding part returns at a plurality of locations each associated with a corresponding retail computing device of a plurality of retail computing devices;
assigning a level of complexity to the at least a portion of the target vehicle diagnostic information, wherein the level of complexity at least partially reflects the data regarding the frequency of returns;
retrieving clickstream data reflecting access by user computing devices of repair-related information provided by the EBRS host system and reflecting timing of subsequent activity between the user computing devices and the EBRS host system, wherein the clickstream data is stored in the one or more databases as data reflecting interactions between user computing devices and the EBRS host system; and
generating aggregate timing data based at least in part on the clickstream data, wherein the aggregate timing data reflects an estimated repair time associated with the at least a portion of the target vehicle diagnostic data; and
transmit an interface comprising the complexity information, the vehicle diagnostic information, and the fix information, to a third party computing device.

14. The apparatus of claim 13, wherein the computer-executable instructions are further configured to cause the apparatus to retrieve, by the EBRS host system and based on the evaluation of the vehicle diagnostic information, fix information identifying required part types and required tools associated with the target vehicle diagnostic information.

15. The apparatus of claim 14, wherein the interface transmitted to the third party computing device additionally facilitates execution of a purchase between the third party computing device and the EBRS host system of at least one of: (a) required parts from each of the required part types and the required tools, or (b) recommended parts from each of the recommended part types.

16. The apparatus of claim 13, wherein the target vehicle diagnostic information reflects data generated by the onboard computer of the target vehicle and retrieved from the onboard computer of the vehicle by a vehicle diagnostic code reader.

17. The apparatus of claim 13, wherein the target vehicle diagnostic information identifies one or more vehicle problems of the target vehicle.

18. The apparatus of claim 14, wherein the computer-executable instructions, when executed by the at least one processor, further cause the apparatus to:
cause presentation of an interface facilitating selection from a plurality of quality tiers;
receive selection of a quality tier from the plurality of quality tiers, and
prioritizing required parts from each of the required part types and recommended parts from each of the recommended part types based on the selected quality tier.

19. The apparatus of claim 13, wherein the computer-executable instructions, when executed by the at least one processor, further cause the apparatus to:
cause presentation of an interface facilitating selection from a plurality of comprehensiveness tiers; and
receive selection of a comprehensiveness tier from the plurality of comprehensiveness tiers, wherein the recommended part types are generated based on the selected comprehensiveness tier.

20. The apparatus of claim 13, wherein the computer-executable instructions, when executed by the at least one processor, further cause the apparatus to:
cause presentation of an interface facilitating purchase of required parts, required tools, and recommended parts;
receive, after causing presentation of the interface facilitating purchase of required parts, required tools, and recommended parts, additional vehicle diagnostic information;
determine, based on the additional vehicle diagnostic information, whether any vehicle problems exist; and
store an indication of one or more effects of repairs involving purchased required parts, required tools, and recommended parts.

21. The apparatus of claim 20, wherein the computer-executable instructions, when executed by the at least one processor, further cause the apparatus to:
transmit a survey to gather input regarding vehicle problems from a user computing entity reflecting user input;
receive feedback data generated at a user computing device based at least in part on user input provided in response to transmission of the survey;
determine, based on the feedback data, whether any vehicle problems exist; and
store an indication of one or more effects of repairs involving purchased required parts, required tools, and recommended parts.

22. A computer program product comprising at least one non-transitory computer-readable storage medium for generating an interactive vehicle-diagnostic and repair interface for a vehicle having an onboard computer configured for generating diagnostic information, the at least one non-transitory computer-readable storage medium storing computer-executable instructions that, when executed, cause an apparatus to:
receive, by an experience-based repair service (EBRS) host system, target vehicle diagnostic information reflecting data generated by the onboard computer of a target vehicle;
evaluate the target vehicle diagnostic information at least in part by querying one or more databases storing fix information associated with vehicle diagnostic information;
retrieve, based at least in part on the evaluation of the target vehicle diagnostic information, fix information stored at the one or more databases and identifying recommended part types associated with the target vehicle diagnostic information;
provide at least a portion of complexity information relating to at least a portion of the target vehicle diagnostic information and comprising a level of complexity and an estimated repair time associated with the at least a portion of the target vehicle diagnostic information, wherein the complexity information is generated at least in part by:
retrieving historical information regarding frequency of returns of the recommended part types associated with the target vehicle diagnostic information, wherein the historical information regarding frequency of returns is generated at least in part by one or more retail computing devices and the EBRS host system and the historical information regarding frequency of returns is based at least in part on aggregate information regarding part returns at a plurality of locations each associated with a corresponding retail computing device of a plurality of retail computing devices;
assigning a level of complexity to the at least a portion of the target vehicle diagnostic information, wherein the level of complexity at least partially reflects the data regarding the frequency of returns;
retrieving clickstream data reflecting access by user computing devices of repair-related information provided by the EBRS host system and reflecting timing of subsequent activity between the user computing devices and the EBRS host system, wherein the clickstream data is stored in the one or more databases as data reflecting interactions between user computing devices and the EBRS host system; and
generating aggregate timing data based at least in part on the clickstream data, wherein the aggregate timing data reflects an estimated repair time associated with the at least a portion of the target vehicle diagnostic data; and
transmit an interface comprising the complexity information, the vehicle diagnostic information, and the fix information, to a third party computing device.

\* \* \* \* \*